United States Patent
Abedi

(10) Patent No.: US 9,072,114 B2
(45) Date of Patent: Jun. 30, 2015

(54) IMPROVEMENTS TO BODY AREA NETWORKS

(75) Inventor: Saied Abedi, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 13/254,085

(22) PCT Filed: Feb. 2, 2010

(86) PCT No.: PCT/GB2010/050157
§ 371 (c)(1),
(2), (4) Date: Jan. 13, 2012

(87) PCT Pub. No.: WO2010/100443
PCT Pub. Date: Sep. 10, 2010

(65) Prior Publication Data
US 2012/0106397 A1    May 3, 2012

(30) Foreign Application Priority Data

Mar. 4, 2009  (EP) ..................................... 09154331

(51) Int. Cl.
*H04L 12/28*   (2006.01)
*H04W 74/08*   (2009.01)
(Continued)

(52) U.S. Cl.
CPC .......... *H04W 74/0875* (2013.01); *H04W 84/18* (2013.01); *H04W 76/02* (2013.01); *H04L 12/28* (2013.01); *H04W 72/10* (2013.01); *H04W 74/08* (2013.01); *H04W 76/007* (2013.01)

(58) Field of Classification Search
CPC ....... H04W 84/18; H04W 76/02; H04L 12/28
USPC ........................................... 455/436; 370/255
See application file for complete search history.

(56) References Cited

U.S. PATENT DOCUMENTS

| | | | |
|---|---|---|---|
| 6,424,834 B1 * | 7/2002 | Chang et al. ................... | 455/436 |
| 2004/0253996 A1 | 12/2004 | Chen et al. | |

(Continued)

FOREIGN PATENT DOCUMENTS

| | | |
|---|---|---|
| TW | I256796 | 6/2006 |
| TW | 200711487 | 3/2007 |
| WO | 2009/024925 | 2/2009 |

OTHER PUBLICATIONS

Tetsuya Kawai, et al., "Proposal of an Assured Corridor Mechanism for Urgent Information Transmission in Wireless Sensor Networks," IEICE Trans. Commun., vol. E90-B, No. 10, Oct. 2007.
A. El-Hoiydi, et al, "WiseMAC: An Ultra Low Power MAC Protocol for the Downlink of Infrastructure Wireless Sensor Networks," ISCC, pp. 244-251, Jun. 2004.
IEEE 802.15.4-2006 Standard, Sep. 8, 2003.
IEEE 802.15.3-2003 Standard, Sep. 29, 2003.
IEEE 802.15.6 Standard, Jun. 2011.

(Continued)

*Primary Examiner* — Helal A Algahaim
*Assistant Examiner* — Mahmoud Ismail
(74) *Attorney, Agent, or Firm* — Staas & Halsey LLP

(57) ABSTRACT

A communication method in a wireless sensor system of networks served by a first non-beacon mode coordinator and a second beacon-mode coordinator, initially, placing all network devices in a first network of the first coordinator; monitoring a parameter of each entity by sensors of the network devices; transmitting sensor data from the network devices in the first network to the first coordinator; detecting an emergency state with respect by using the monitored parameters; in response to detection of the state, handing over the network devices to the second network; transmitting sensor data from the network devices in the second network to the second coordinator; and in response to detection of the emergency state, handing over the associated network devices to the first network.

11 Claims, 16 Drawing Sheets

(51) Int. Cl.
*H04W 84/18* (2009.01)
*H04W 76/02* (2009.01)
*H04W 76/00* (2009.01)
*H04W 36/00* (2009.01)
*H04W 72/10* (2009.01)

(56) References Cited

U.S. PATENT DOCUMENTS

2005/0131485 A1 6/2005 Knudson et al.
2006/0031378 A1 2/2006 Vallapureddy et al.
2006/0092907 A1 5/2006 Shimokawa et al.

OTHER PUBLICATIONS

European Search Report issued Sep. 2, 2009 in European Application No. 09154329.8-1249.
International Search Report issued Mar. 19, 2010 in PCT/GB2010/050157.
Taiwanese Office Action issued Jul. 30, 2013 in corresponding Taiwanese Application No. 099105302.
Chinese Office Action issued Aug. 29, 2013 in corresponding Chinese Application No. 201080010242.9.
Tetsuya Kawai et al., "Proposal of an Assured Corridor Mechanism for Urgent Information Transmission in Wireless Sensor Networks", IEICE Trans. Commun., vol. Exx-??, No. xx XXXX 200x, pp. 1-10.

* cited by examiner

| Bits: 0 - 2 | 3 | 4 | 5 | 6 | 7 - 9 | 10 - 11 | 12 - 13 | 14 - 15 |
|---|---|---|---|---|---|---|---|---|
| Frame Type | Security Enabled | Frame Pending | Ack. Request | PAN ID Compression | Reserved | Dest. Addressing Mode | Frame Version | Source Addressing Mode |
| 51 | 52 | 53 | 54 | 55 | 56 | 57 | 58 | 59 |

| Frame type value b2 b1 b0 | Description |
|---|---|
| 000 | Beacon |
| 001 | Data |
| 010 | Acknowledgment |
| 011 | MAC command |
| 100 - 111 | Reserved |

| Octets: 2 | 1 | (see 7.2.2.4.1) | 0/5/6/10/14 | 1 | variable | 2 |
|---|---|---|---|---|---|---|
| Frame Control | Sequence Number | Addressing fields | Auxiliary Security Header | Command Frame Identifier | Command Payload | FCS |
| MHR | | | | MAC Payload | | MFR |

| Command frame identifier | Command name | RFD Tx | RFD Rx |
|---|---|---|---|
| 0x01 | Association request | X | |
| 0x02 | Association response | | X |
| 0x03 | Disassociation notification | X | X |
| 0x04 | Data request | X | |
| 0x05 | PAN ID conflict notification | X | |
| 0x06 | Orphan notification | X | |
| 0x07 | Beacon request | | |
| 0x08 | Coordinator realignment | | X |
| 0x09 | GTS request | | |
| 0x0a – 0xff | Reserved | | |

Fig.11B

| | 10B<br>TDMA Beacon<br>Mode Coordinator | | 10NB<br>Non Beacon<br>Coordinator |
|---|---|---|---|
| | 11E<br>Medical Device<br>in Emergency | | 13<br>Non-Medical Device<br>Or Medical Device<br>Not in Emergency |
| | 14<br>High Priority<br>Link | | 15<br>Low Priority<br>Link |

Frame Control: 500

| Bits: 0 - 2 | 3 | 6 | 7 | 8 | 9 | 10 - 11 | 12 - 13 | 14 - 15 |
|---|---|---|---|---|---|---|---|---|
| Frame Type | Security Enabled | Frame Pending/ More Data | Emergency | Ack. Policy | PAN ID compression | Destination Addressing Mode | Frame Version | Source Addressing Mode |
| 501 | 502 | 503 | 504 | 505 | 506 | 507 | 508 | 509 |

Fig.18

| Frame Type Value (3 bits) | Description |
|---|---|
| 000 | Beacon frame |
| 001 | Data frame |
| 010 | ACK |
| 011 | MAC command |
| 100, 101, 110 | Reserved |
| 111 | Emergency |

| Bits: 0-2 | 3 | 4 | 5 | 6 | 7 | 8-9 | 10-11 | 12-13 | 14-15 | Extd bits:0 | Extd bits:1 | Extd bits:2 | Extd bits:3 |
|---|---|---|---|---|---|---|---|---|---|---|---|---|---|
| Frame Type 501' | Security Enabled | Frame Pending | ACK Req | PAN ID Compression | Emergency | ACK types | Dest. Addressing Mode | Frame Vn. | Srce Addressing Mode | Urgnt 1 | Urgnt 2 | Batt Level 1 | Batt Level 2 |

511 (Urgnt 1 / Urgnt 2)  
512 (Batt Level 1 / Batt Level 2)

| Frame Type Value b2 b1 b0 | Description |
|---|---|
| 000 | Beacon frame |
| 001 | Data frame |
| 010 | ACK |
| 011 | MAC command |
| 100 | Immediate Ack |
| 101 | Delayed Ack |
| 110 | Reserved |
| 111 | Emergency |

| Octets | 1 | 1 |
|---|---|---|
| MHR Fields | Command Frame Identifier Handover (0x0b) | MAC Command Payload<br>Example<br>ID of most suitable coordinator/coordinators |

44'

440'

| Command Frame Identifier | Command name | RFD | |
|---|---|---|---|
| | | Tx | Rx |
| 0x01 | Association request | X | |
| 0x02 | Association response | | X |
| 0x03 | Disassociation notification | X | X |
| 0x04 | Data request | X | |
| 0x05 | PAN ID conflict notification | X | |
| 0x06 | Orphan notification | X | |
| 0x07 | Beacon request | | |
| 0x08 | Coordinator realignment | | X |
| 0x09 | GTS request | | |
| 0x0a | Emergency notification | X | X |
| 0x0b | Handover | X | X |
| 0x0c - 0xff | Reserved | | |

IMPROVEMENTS TO BODY AREA NETWORKS

CROSS REFERENCE TO RELATED APPLICATIONS

This application is a national phase application, under 35 U.S.C. 371, of international application No. PCT/GB2010/050157, filed on Feb. 2, 2010, which claimed priority to European Patent Application No. 09154331.4, filed on Mar. 4, 2009, the disclosures of which are incorporated herein by reference.

FIELD OF THE INVENTION

The present invention relates to wireless sensor networks including personal area networks and particularly, but not exclusively, to body area networks including wirelessly-communicating sensors disposed on or around, or implanted in, human or animal bodies.

BACKGROUND OF THE INVENTION

Various types of wireless sensor network have been proposed. Among these, the so-called Body Area Network or BAN is an example of wireless personal area networks (WPANs), used to convey information over relatively short distances.

Unlike wireless local area networks (WLANs), connections effected via WPANs involve little or no infrastructure. This feature allows small, power-efficient, inexpensive solutions to be implemented for a wide range of devices. Of particular interest is the possibility of the medical BAN (MBAN) in which sensors are used to monitor the status of one or more patients. A BAN employing mainly sensors for feeding sensed data to a data sink is an example of a wireless sensor network (WSN); however, more active devices, such as actuators, may be also be included in a MBAN.

Standard IEEE 802.15.4 defines the physical layer (PHY) and medium access control (MAC) sublayer specifications for low data-rate WPANs. IEEE 802.15.4 has some similarities with a standard for higher data-rate WPANs, IEEE 802.15.3. The documents IEEE Std 802.15.4-2006 and IEEE Std 802.15.3-2003 are hereby incorporated by reference in their entirety.

WPANs of the type envisaged in IEEE 802.15.4 are suitable for applications such as industrial monitoring, but do not offer the kind of data reliability required for MBANs. In medical applications, there is a requirement to reduce the costs associated with human labour while increasing the reliability and process automation and reducing human error. Sensors can provide the required intelligence, and already are widely employed in medical equipment. This includes hospital recuperative care, home care, intensive care units and advanced surgical procedures. There are many different types of sensors employed for medical applications, including external sensors for pulse, temperature etc., sensors which come in contact with body fluids, sensors used in catheters (through incision), sensors for external applications, disposable skin patches with wireless sensors, and implantable sensors.

A WPAN of one or more sensors around each of the patients in a hospital or medical ward could provide multiple clinical benefits including patient mobility, monitoring flexibility, extension of monitoring into care areas that are currently unmonitored, reduced clinical errors and reduced overall monitoring costs. Body worn sensors may include various sensor types on a single patient body. They require a capability to be applied or removed quickly from the patient's body.

On an individual basis, such sensors may have bit rates of as low as 1-2 kbps per patient and on an aggregate basis they may require a 10 kbps bit rate. A range of as little as a few meters may be adequate. However, medical WSN applications are mission critical applications in the clinical environment. Robust wireless links for bounded data loss and bounded latency, capacity for patient and sensor density, coexistence with other radios, battery life for days of continuous operations and small form factors for body worn devices, are among the requirements for medical WSNs or MBANs. These requirements can be satisfied through utilization of techniques such as diversity and error control techniques in the time and frequency domain, including Forward Error Correction (FEC) and Adaptive Repeat reQuest (ARQ), low duty cycle TDMA for sensor information rate, and more efficient small antennas.

Efforts are therefore in progress to define a further standard IEEE 802.15.6 which aims to define the properties of Body Area Networks, particularly for medical applications. One of the key requirements of IEEE 802.15.6 is high reliability for medical applications with low battery consumption. This is even more important for emergency situations where the lives of the patients depends on the reliability of wireless links in medical WSN applications. Existing standards such as IEEE 802.15.4 have been designed for commercial application with no consideration of such emergency life saving scenarios.

In particular, there is a need to ensure reliability of communications with network devices such as sensors involved in such an emergency situation, without increasing the power consumed by the network devices.

SUMMARY OF THE INVENTION

According to a first aspect of the present invention, there is provided a wireless sensor system comprising a plurality of network devices, a first coordinator arranged to perform non-beacon-mode communication with a first subset of the network devices, and a second coordinator arranged to perform beacon-mode communication with a second subset of the devices, the system having means for determining which of the network devices to include in the first or second subsets in dependence upon whether an emergency state exists with respect to the devices.

According to a second aspect of the present invention, there is provided a wireless sensor system comprising a plurality of network devices, a first coordinator arranged to perform non-beacon-mode communication with a first subset of the network devices, and a second coordinator arranged to perform beacon-mode communication with a second subset of the devices, the system having means for handing over one or more devices between the first subset and the second subset in dependence upon whether an emergency state exists with respect to the devices.

Thus, these aspects of the present invention involve the dual use of non beacon-mode and beacon-mode coordinators, and network devices which are capable of handover between the beacon-mode and non beacon-mode coordinators, allowing "emergency" communications such as sensor data to be sent via the beacon-enabled mode for greater reliability. Note that the coordinators need not be physically distinct but could be provided in a common unit.

As will be apparent to those skilled in the art, the use of two coordinators implies the existence of at least two networks but for the purposes of the claims, the term "system" is intended to embrace any number of such networks. The term "network" is used to refer to each of the beacon-mode and non beacon-mode networks provided by the respective coordinators.

Here, preferably, the emergency state with respect to the entity involves a critical level of a parameter of the entity sensed by a sensor in the system.

In either of the above aspects, preferably, whether or not an emergency state exists with respect to a network device will depend on whether it is involved with monitoring some kind of entity (such as living body) which is in a critical condition.

When the system is used for monitoring a plurality of entities (such as a number of patients in a hospital ward), a respective subset of the network devices is assigned to monitor each entity, each subset of network devices being included in the first or second network, or handed over between the first and second network, as a unit. Thus, as soon as an emergency state exists with respect to even one of the network devices monitoring a specific entity, all of the network devices monitoring that entity are preferably handed over together.

As mentioned above, the existence or non-existence of the emergency state is preferably determined based on a critical level of one or more parameters sensed by sensors of the network devices in the respective subset. That is, for example, it is detected whether a sensed value of a parameter has crossed the critical level.

In the above system, preferably, the first and second coordinators are arranged to start from an initial state in which all network devices are included in the first network, to hand over one or more network devices from the first network to the second network in response to the starting (coming into existence) of the emergency state, and to hand over one or more network devices from the second network to the first network in response to ending (lifting) of the emergency state.

The wireless sensor system will typically be one in which information is wirelessly transmitted within the system within frames each having a frame control field, the declaration of the emergency state being made by setting a value in the frame control field to a predefined value.

Preferably, the frames include frames of different types, and the predefined value denotes an emergency frame type. The frame control field may include at least one bit for signalling existence or non-existence of the emergency condition.

Such a frame-based system can include a IEEE 802.15.6-based MBAN. In a preferred application, the above-mentioned entities are living bodies, each sensor is for sensing a life parameter of the living body of a patient, and the emergency state is a medical emergency.

The network device may be one of a plurality of network devices assigned to monitoring the same entity, in which case the emergency state may be determined in accordance with the level of a parameter sensed by the network device or by any of the network devices assigned to the same entity.

Normally, beacon-mode communication will be selected for the more important communications of network devices in emergency, and non beacon-mode mode used by other network devices not in emergency.

The determination of the existence or non-existence of the emergency state may be made in the network device itself. Alternatively the determination of the existence or non-existence of the emergency state may be made outside the network device, for example by either of the first and second coordinators, in which case the network device is arranged to receive notification of such determination.

According to a third aspect of the present invention, there is provided a coordinator in a wireless sensor system having a plurality of network devices including sensors for monitoring at least one entity, the system configured for simultaneous beacon-mode and non beacon-mode communication of the network devices, wherein the coordinator is arranged for non beacon-mode communication with at least a subset of the network devices and is responsive to a determination of the existence of an emergency state of the entity to hand over one or more network devices of the subset to another coordinator for beacon-mode communication.

Thus, a determination that an emergency state exists (i.e. has started) with respect to the entity (whether made by the coordinator itself, or notified to it from elsewhere such as by one of the network devices it is serving), leads to the coordinator transferring responsibility for one or more network devices involved in the emergency, to the other coordinator. This enables those network devices to conduct beacon-mode communication with the other coordinator for more reliable transfer of sensor data, etc.

According to a modification of this aspect, there is provided a coordinator in a wireless sensor system having a plurality of network devices including sensors for monitoring at least one entity, said system configured with respective networks for simultaneous beacon-mode and non beacon-mode communication of said network devices, wherein said coordinator is arranged for non beacon-mode communication with some of said network devices and is responsive to a determination of an emergency state of at least one of those devices to switch to beacon-mode communication with the at least one device whilst handing over any other devices to another coordinator for non beacon-mode communication. In this modification, therefore, the original coordinator retains responsibility for the device(s) in emergency but switches to beacon-mode for enabling a more reliable communication (e.g. through use of guaranteed time slots) with the device(s) in emergency.

According to a fourth aspect of the present invention, there is provided a coordinator in a wireless sensor system having a plurality of network devices including sensors for monitoring at least one entity, the system configured for simultaneous beacon-mode and non beacon-mode communication of the network devices, wherein the coordinator is arranged for beacon-mode communication with at least a subset of the network devices and is responsive to a determination of non-existence of an emergency state of the entity to hand over one or more of the network devices to another coordinator for non beacon-mode communication.

Thus, determination of the ending of an emergency state with respect to the entity (whether made by the coordinator itself, or notified to it from elsewhere such as by one of the network devices it is serving), leads to the coordinator transferring responsibility for one or more network devices which are no longer in emergency, to the other coordinator. This enables those network devices to conduct non beacon-mode communication with the other coordinator for routine transfer of non-urgent sensor data, etc.

Alternatively, a handover of a group devices in emergency may be made if they move out of range of an existing beacon-based coordinator, for example as a result of movement of a patient. The devices are handed over together to another coordinator within range, preferably a beacon mode coordinator.

Other factors besides the existence of an emergency state may be taken into account prior to performing a handover between the coordinators, particularly for handovers from a beacon-mode coordinator to a non beacon-mode coordinator or another beacon-mode coordinator. For example, each coordinator may be aware of the locations of each of the network devices it is serving, and determine whether or not handover is appropriate in dependence upon the distance of the network device from itself and from another coordinator in the system. That is, handover may be inhibited so long as any moving network devices remain within range of the serving coordinator. Additionally, signal strength (as indicated by SIR for example) may be an additional factor taken into account, such that handover is not performed while the SIR is above a given threshold.

An embodying the present invention enables all the devices in a group and which are in an emergency state (e.g. a group of sensors all attached to the same patient) to be handed over together. This allow a patient's moves within a hospital to be followed whilst monitoring the patient with a high-stability transmission link.

According to a further aspect of the present invention, there is provided a method of performing communications of network devices in a wireless sensor system served by a first coordinator for non beacon-mode communication and a second coordinator for beacon-mode communication, the network devices associated with at least one entity to be monitored and the method comprising:

initially, placing all the network devices in a first network served by the first coordinator;

monitoring one or more parameter of the or each entity by sensors of the associated network devices;

transmitting sensor data from the network devices in the first network to the first coordinator;

detecting starting or ending of an emergency state with respect to the entity by using the monitored parameters;

in response to detection of starting of the emergency state with respect to the entity, handing over the associated network devices to the second network;

transmitting sensor data from the network devices in the second network to the second coordinator; and in response to detection of ending of the emergency state with respect to a said entity, handing over the associated network devices to the first network.

Further aspects of the present invention provide software which, when executed by a processor of a network device or a coordinator of a wireless sensor system, provides the above network device or one of the above-defined coordinators, respectively. Such software may be stored on a computer-readable medium.

BRIEF DESCRIPTION OF THE DRAWINGS

For a better understanding of the present invention, and to show more clearly how it may be carried into effect, reference will now be made, by way of example only, to the following drawings in which:

FIG. 10A shows the structure of a Frame Control field in the frame format of FIG. 9;

FIG. 10B is a table of hitherto-defined values of frame type bits in the Frame Control field of FIG. 10A;

FIG. 11A shows part of the frame format used for a MAC command frame in IEEE 802.15.4;

FIG. 11B is a table of hitherto-defined values of a command frame identifier in the frame format of FIG. 11A;

FIG. 18 shows the novel structure of the Frame Control field proposed in an embodiment of the present invention;

FIG. 19 is a table of possible values of frame type bits in the Frame Control field of FIG. 18;

FIG. 20 shows the structure of a Frame Control field in a frame format modified in accordance with another embodiment of the present invention;

FIG. 21 is a table of frame type values in the Frame Control field of FIG. 20; and FIG. 22 shows a modification of the command frame identifier of FIG. 11A/B in another embodiment of the present invention.

DISCLOSURE OF THE INVENTION

Figure 1:
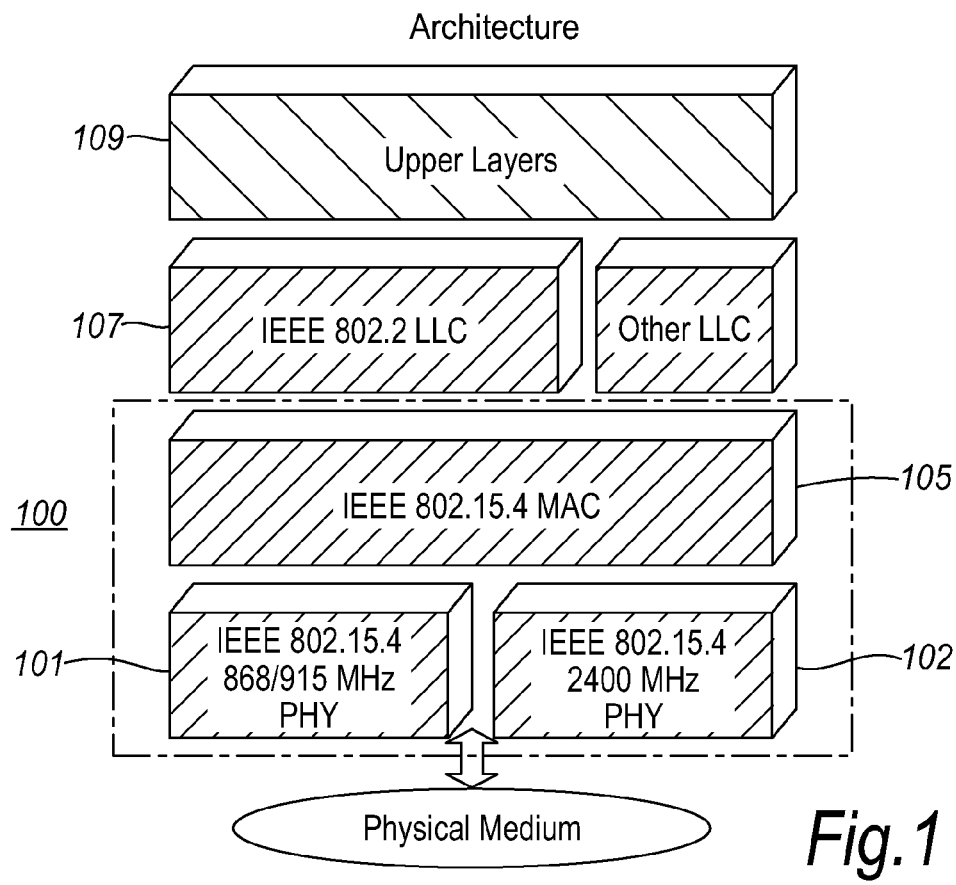
FIG. 1 illustrates protocol layers in an IEEE 802.15.4 WPAN.

Before explaining the embodiments of the present invention, some background explanation will first be given of multiple access protocols used in wireless networks, followed by a summary of those parts of IEEE 802.15.4 which are expected to have relevance for the IEEE 802.15.6 standard currently under development, and/or for Body Area Networks including MBANs.

Multiple access refers to the possibility for multiple network devices in a wireless network to share the same radio channel. To enable multiple access, wireless networks are generally organised either based on frequency division (where transmissions from respective network devices are kept separate by using different frequencies) or on time division (where transmissions are separated by being performed at different times). It is possible to employ both frequency and time division at the same time. For the remainder of this description, reference will be made to time-division schemes although as the skilled person will realise, techniques analogous to those described may be applied also in the frequency-division case.

Time-division based networks typically divide time into equal time intervals called "frames". Various protocols have been devised which provide more or less reliability of communication (by which is meant the probability of a given transmission being successfully received) in accordance with the amount of information available to the network devices. One such protocol is called ALOHA, also called "pure ALOHA", and is suited for wireless networks in which the network devices have no knowledge either of each other or of a predetermined time reference.

In a network using the pure ALOHA protocol, any network device may initiate a data transmission at any random time within a time frame. Because of the random times at which a network device may initiate a data transmission, two or more network devices may initiate a data transmission at overlapping times, resulting in a "collision." Transmissions involved in such collisions arrive at a receiver with errors. After a suitable delay without receiving acknowledgments confirming successful reception, the transmitters retry the transmissions. In turn, these transmissions may also encounter collisions and therefore may also be unsuccessful. The terminals continue transmitting with suitable delay between transmissions, until the transmissions are received without error and acknowledged. Collisions reduce the throughput efficiency of the network.

One important variation of the Aloha protocol is called "slotted ALOHA." A communication network using a slotted ALOHA divides each frame into a series of time slots and (generally) allows each network device to transmit at will using any of the slots. All data transmissions from any network device must begin and end within a time slot. If a network device has a data transmission which is longer than a time slot period, then it must break the data transmission up into two or more shorter data transmissions which each fit within a time slot period. Confining transmissions within fixed slots reduces the probability of collisions, thus making communications between network devices more reliable, but does not avoid collisions completely. A drawback of slotted-ALOHA is the need for every network device to be synchronised to the start of each frame, in order to know the slot timings. In practice, this is achieved by the network devices listening to a broadcast timing reference signal or "beacon" at the start of each frame.

An alternative protocol, avoiding the need for a timing reference, is called CSMA-CA for Carrier Sense Multiple Access with Collision Avoidance. In CSMA-CA, whenever a device wishes to transmit within the CAP, it waits for a random period. If the channel is found to be idle, following the random backoff, the device transmits its data. If the channel is found to be busy following the random backoff, the device waits for another random period before trying to access the channel again.

A further protocol known as TDMA for Time Division Multiple Access requires a network controller or coordinator to allocate time slots for the exclusive use of network devices so as to avoid the potential for collisions. However, this requires not only that a central coordinator be provided but also that all network devices listen for a beacon and for notification of the slot(s) allocated to them before starting transmission.

Different protocols may be used in the same network, for example for an uplink (i.e. data transmissions to a central point such as a coordinator or base station) and downlink (data transmissions to a network device such as sensor) respectively.

In this regard, one proposed protocol for the downlink of a WSN is called Wise MAC for Wireless sensor MAC. This is a beacon-less scheme which involves each network device listening to the radio channel for a short time with the same constant period. If a network device detects activity it continue to listen until a data frame is received or until the channel becomes idle again. Meanwhile, the coordinator adds a wake up preamble in front of every data frame, to ensure that the receiver will be awake when the data portion of the frame arrives. In this way, power consumption of the network devices is kept very low when the channel is idle.

In IEEE 802.15.4, as discussed below, both beacon-enabled and beacon-less topologies are provided for. The beacon-enabled topology uses a combination of protocols, with the concept of the "frame" replace by a "superframe" containing slots for both contention-based access via CSMA-CA, and guaranteed time slots (GTSs) allocated on a TDMA basis for exclusive use of a network device. Whilst this provides for reliable transmission of data by allocation of the GTSs, there is the drawback that the network devices have to remain powered-up ("awake") to listen to the coordinator for timing and slot allocation information.

To summarise, whilst beacon-based communication protocols providing a timing reference and (super-)frame structure allow fewer collisions and thus more reliable communication, this is at the expense of power consumption of the network devices. With beacon-less schemes, on the other hand, although the power consumption can be kept very low during inactive periods, the throughput is less guaranteed and the latency time (delay until obtaining channel access) is higher compared with beacon-based schemes.

The present invention proposes a channel access scheme for IEEE802.15.6 which allows to combine the benefits of both a high level of reliability and a low power consumption of network devices. Before explaining how this scheme works, some more information about the general configuration of an IEEE 802.15.4 network will now be given, as similar configuration is expected to be used for IEEE 802.15.6.

Figure 2:
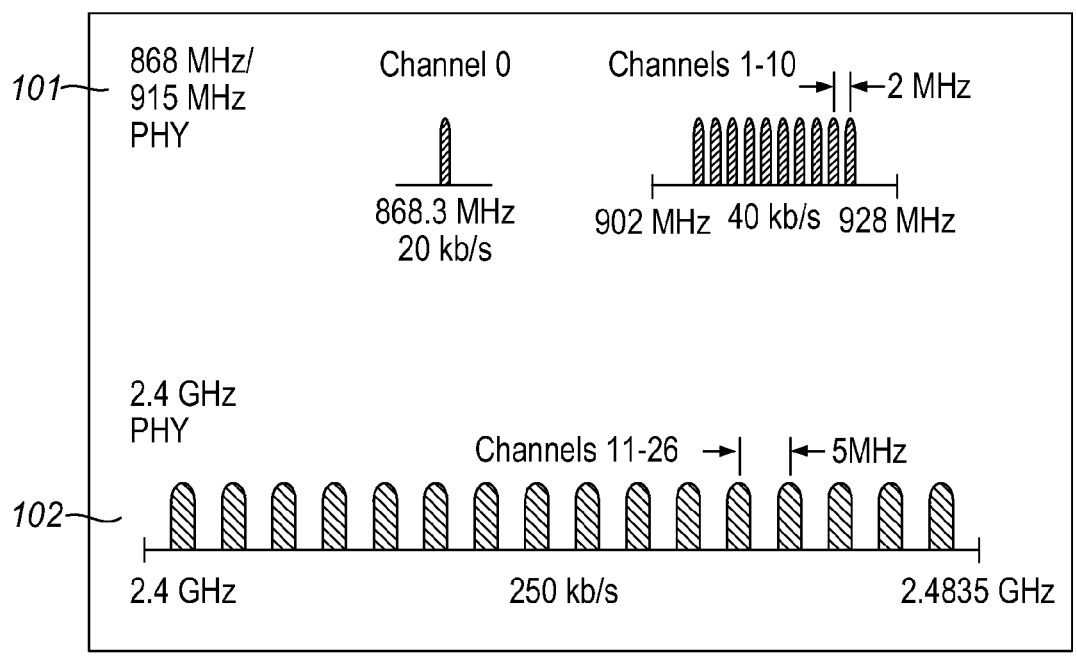
FIG. 2 illustrates possible PHY bands of the IEEE 802.15.4 WPAN.

FIG. 1 shows the general architecture of a IEEE 802.15.4 WPAN, labelled 100, in terms of the layered OSI model, in which the physical medium is accessed via a PHY layer containing the radio transceiver and its low-level control. As shown, there are two alternative frequency bands 101, 102 for the PHY, which are illustrated in FIG. 2. The lower frequency band 101 provides a single 20 kb/s channel centred on 868.3 MHz, and/or ten channels each of 40 kb/s centred on 915 MHz. The higher frequency band 102 provides 16 channels each of 250 kb/s and centred on a frequency of 2.44 GHz. Which of these bands is used will depend on local regulatory requirements.

Access to the PHY is provided by a MAC (Medium Access Control) sublayer indicated by 105 in FIG. 1. Above this, and external to the WPAN 100 as such, are provided a LLC (Link Layer Control) allowing access to the WPAN from other networks; this may be in accordance with the IEEE 802.2 standard, or of another type. Finally, upper layers 109 above the LLC include a network layer to provide network configuration, manipulation, and message routing, and an application layer which provides the intended overall function.

Figure 3:
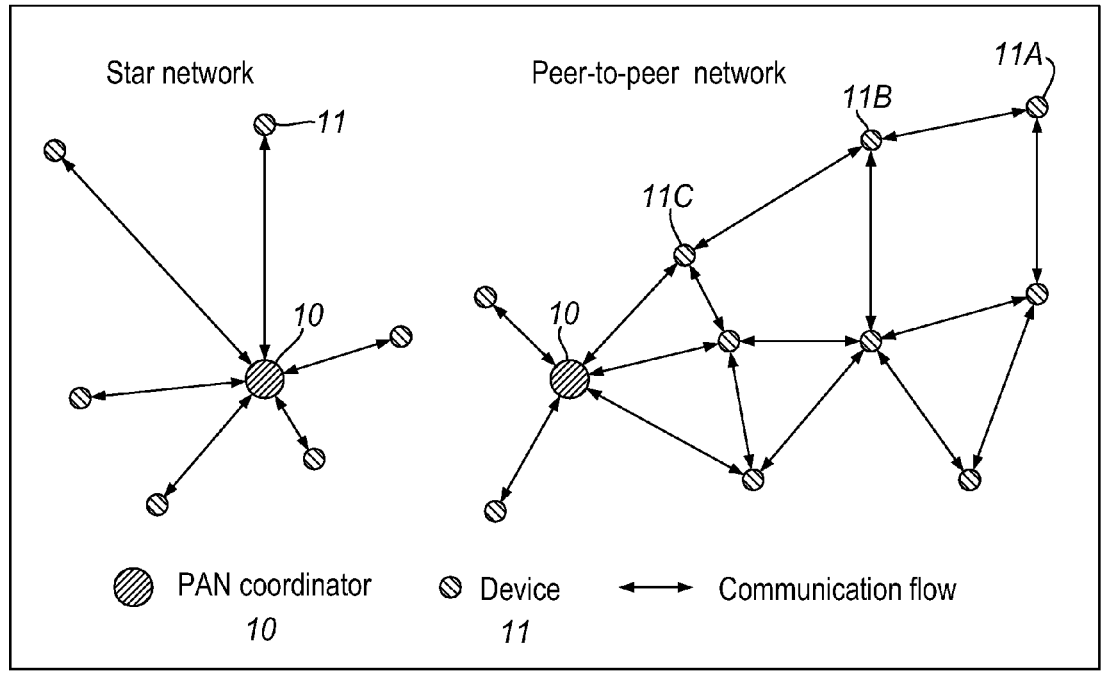
FIG. 3 illustrates Star and Peer-to-Peer topologies of a WPAN.

One task of the MAC sublayer is to control the network topology. Star and peer-to-peer are two known topologies in communications networks, and both are provided for in IEEE 802.15.4. In both cases, the topology distinguishes between two basic kinds of network node: devices and coordinators. As shown in FIG. 3, in the Star topology a number of devices 11 communicate directly with a central co-ordinator 10; whilst in the peer-to-peer configuration, communications by a device 11A with the communicator are made along one or more hops with intermediate devices 11B and 11C acting as relays. The coordinator acts as the access point to the upper layers; in the case of a WSN, it acts as the sink for the data collected by the sensors. Given that the communication range of each device may be very limited (a few meters), the peer-to-peer topology allows a greater area to be covered. The topology may be dynamic, changing as devices are added or leave the network.

In the case of MBANs, for example, a star network would be appropriate in the situation where a coordinator is provided at each patient site (such as a hospital bed), exchanging signals with devices on a single patient. Peer-to-peer would be a more appropriate topology where one coordinator was provided to serve a number of patients (the coordinator might be located at a fixed point in a hospital ward). Thus, whilst the devices 11 will generally be mobile the coordinator may be either mobile or fixed. Peer-to-peer networks may also be more suited to fast-changing environments where it is required to set up or change the network quickly, or to allow self-organisation and self-healing of the network. Self-healing may include, for example, establishing a new coordinator in the event that an existing coordinator has failed or left the network.

Multiple star and/or peer-to-peer networks may be set up in the same location such as a hospital, each with their own coordinator. In this case it will be necessary for the respective coordinators to collaborate in order to avoid mutual interference and to allow sharing or collation of data. In IEEE 802.15.4 such networks are called clusters, and provision is made for establishing an overall coordinator for the clusters as well as for dividing and merging clusters.

Nodes in a WPAN may be constituted by units of varying capabilities. Generally, the role of coordinator will require a relatively capable apparatus with some processing power and transceiver capable of handling transmissions from multiple sources simultaneously. This in turn will necessitate a sufficient provision of electrical power (in some cases, it may be mains powered). On the other hand, other devices in the network may have more limited processing ability and access only to battery power, and may even be so simple as to be unable to act as a relay hop. Devices with very low power availability may be shut down most of the time and only "wake up" occasionally, for example to transmit sensor data to another node. Thus, the IEEE 802.15.4 standard distinguishes between "full-function" and "reduced function" devices. Availability of power is a particular issue for MBANs in which sensors may be implanted within a body and thus unable to have a large or rechargeable battery.

As already mentioned, IEEE 802.15.4 provides for beacon-enabled and non beacon-enabled network topologies.

Figure 4:
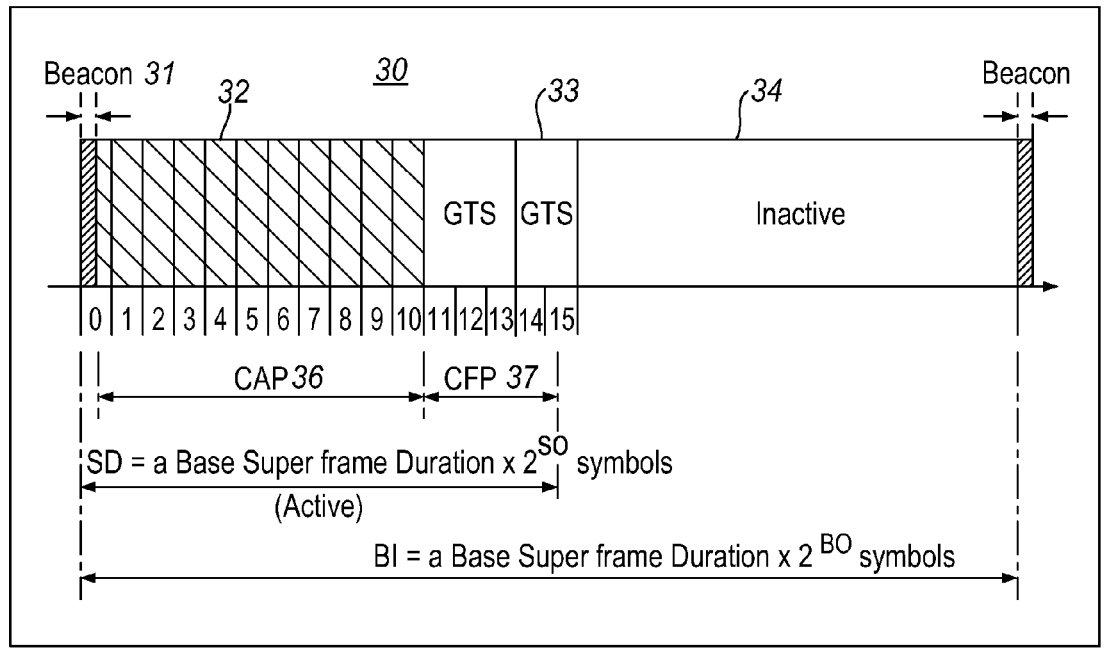
FIG. 4 shows the structure of a superframe in a beacon-enabled IEEE 802.15.4 WPAN.

In a beacon enabled network, the coordinator transmits a beacon periodically and devices listen periodically to that beacon to synchronize to the network and to access the channel. The channel access is in units of "frames" transmitted sequentially within a "superframe" according to a superframe structure as shown in FIG. 4, which is defined by the coordinator. Each superframe 30 consists of two parts: active and inactive. The active part is divided into a contention access period CAP 36, followed by an optional contention free period CFP 37 for guaranteed access for applications with quality of service requirement.

As indicated by the vertical divisions in FIG. 4, the superframe is divided into 16 equally-spaced time slots each capable of carrying a frame of data from the coordinator or from a device. Thus, considering the devices associated with one coordinator, only one device may be in communication with the coordinator at a time during each successive time slot within the superframe. First comes a slot 31 for a beacon frame (see below) transmitted by the coordinator. After this, several slots 32 are provided within the CAP, allowing data transmission to or from devices on a contended basis using CSMA-CA.

Next there follow the guaranteed time slots GTS 33 of the CFP, allowing channel access to devices in a beacon-based network and as shown, each of these may extend over more than one basic time slot. After the expiry of the inactive period, the next superframe is marked by the coordinator sending another beacon frame 31. Devices can go to sleep during the inactive period 34 of the superframe. Thus, by extending the length of the inactive period 34, battery power of devices can be conserved as much as possible.

In the non beacon enabled network, the coordinator is not required to transmit a beacon for synchronization unless it is requested to do so (e.g. for network discovery purposes). The channel access is not restricted by the superframe structure and devices are asynchronous, performing all data transfers by CSMA-CA. They can follow their own sleeping pattern according to a protocol such as WiseMAC.

For an MBAN application, the coordinator is external to the body or bodies being monitored. It may be a PDA, a mobile phone, a bedside monitor station or even a sufficiently-capable sensor which on a temporary basis acts as a coordinator. As mentioned above, the coordinator in the beacon enabled network is in charge of providing synchronization and channel access to network devices. The start and end of a superframe is also defined by a coordinator. The coordinator has two main features of potential communications to other networks and access to a sufficient power supply, for example by easy replacement of the charged batteries.

A central care and monitoring unit may also be provided for overall supervision of a network possibly containing several coordinators. This may take the form of a room with monitoring equipments capable of receiving continuous or occasional streams of emergency data from multiple patients. There will typically be nurses or medical specialists stationed in the central unit who are continuously watching and monitoring the patients' data. They will take actions in response to change in patients' conditions. The central care and monitoring unit may be connected wirelessly to the or each coordinator (in which case it may be considered part of the MBAN) or it may have a wired connection to each coordinator (in which case it may be considered as outside the MBAN as such)

FIGS. 5 to 8 illustrate data transfers between a device and a coordinator in a IEEE 802.15.4 network. Three basic types of transfer are defined in IEEE 802.15.4:

(i) data transfer to a coordinator as recipient to which a device (sender) transmits its data—used in both star and peer-to-peer topologies;

(ii) data transfer from a coordinator as sender in which the device receives the data—used in both star and peer-to-peer topologies; and (iii) data transfer between two peers—used in peer-to-peer networks only.

Figure 5:
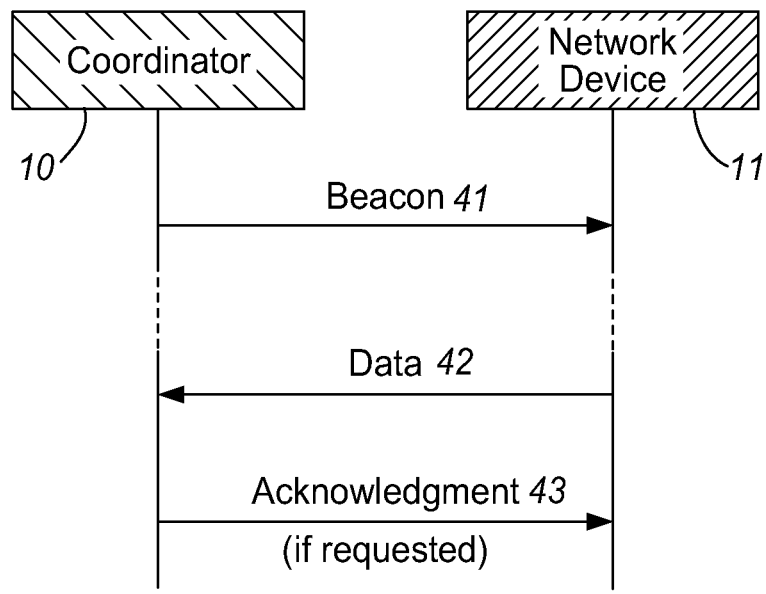
FIGS. 5 to 8 illustrate possible modes of data transfer between a network device and a co-ordinator in a IEEE 802.15.4 WPAN.
Figure 6:
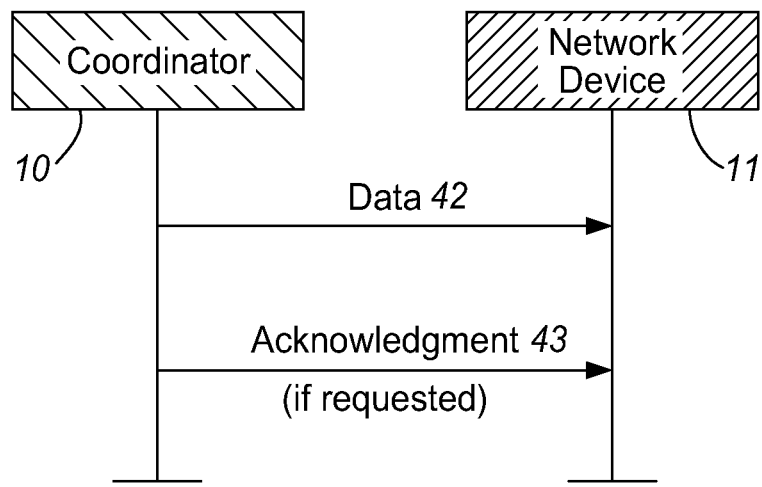

FIGS. 5 and 6 depict a transfer from the device (Network Device 11) and coordinator (Coordinator 10) for both the beacon-enabled and non beacon-enabled case respectively. The difference is that in the beacon-enabled case the device 1 must wait to receive a beacon frame 41 from the coordinator prior to sending the data (data frame 42) using CSMA-CA in the CFP, or using a GTS in the CAP; whilst in the non beacon-enabled case there is normally no beacon frame and the device 11 sends a data frame 42 at will using CSMA-CA. In either case, the coordinator acknowledges the successful reception of the data by transmitting an optional acknowledgment frame or ACK 43. These different types of frame are explained in more detail below.

If the recipient is unable to handle the received data frame for any reason, the message is not acknowledged. If the sender does not receive an acknowledgment after some period, it assumes that the transmission was unsuccessful and retries the frame transmission. If an acknowledgment is still not received after several retries, the sender can choose either to terminate the transaction or to try again. When the acknowledgment is not required, the sender assumes the transmission was successful.

Figure 7:
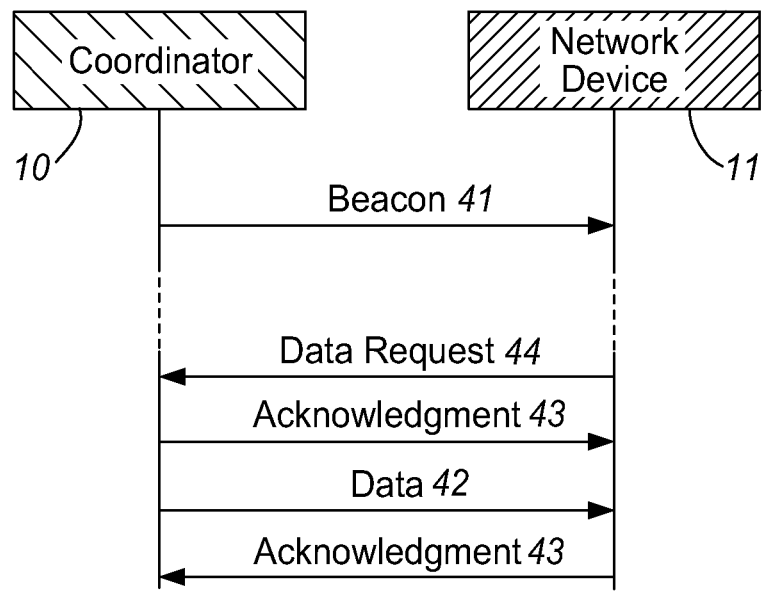
Figure 8:
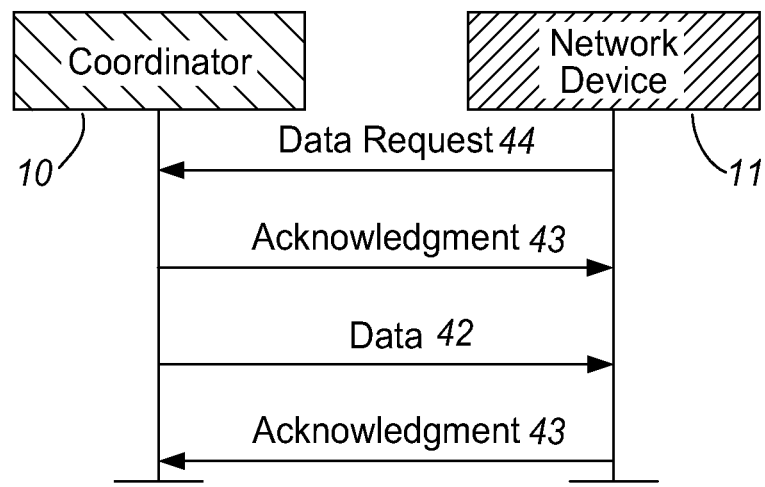

FIGS. 7 and 8 illustrate data transfer from a coordinator 10 to a device 11. When the coordinator wishes to transfer data to a device in a beacon-enabled WPAN (FIG. 7), it indicates in the beacon frame 41 that the data message is pending. The device periodically listens to the beacon frame and, if a message is pending, transmits a data request (MAC command) 44 requesting the data by CSMA-CA. The coordinator 10 acknowledges the successful reception of the data request by transmitting an acknowledgment frame 43. The pending data frame 42 is then sent using slotted CSMA-CA or, if possible, immediately after the acknowledgment. The device 11 may acknowledge the successful reception of the data by transmitting an optional acknowledgment frame 43. The transaction is now complete. Upon successful completion of the data transaction, the message is removed from the list of pending messages in the beacon.

In the non beacon-enabled case, the coordinator 10 which has data ready for a particular device 11 has to wait for a data request 44 from the device concerned, sent on a contention basis. Upon receiving such a request, the coordinator sends an acknowledgement frame 43 (this can also be used to signify that no data is ready, if that is the case), followed by the data frame 42, in response to which the device 11 may send another acknowledgement frame 43 in return.

For simplicity, the above procedures have considered only the above cases (i) and (ii) of data transfers between the device and coordinator, but in a peer-to-peer network, as already mentioned, data transfers will generally take place via mechanism (iii), involving one or more intermediate nodes, which increases the risk of collision and the delays involved.

As indicated in FIGS. 5 to 8, communications in a IEEE 802.15.4 network involve frames of four different types:

beacon frame 41, used by a beacon-type coordinator to transmit beacons data frame 42, used for all transfers of data acknowledgment frame 43, used for confirming successful frame reception MAC command frame 44, used for handling all MAC peer entity control transfers such as data requests.

Figure 9:
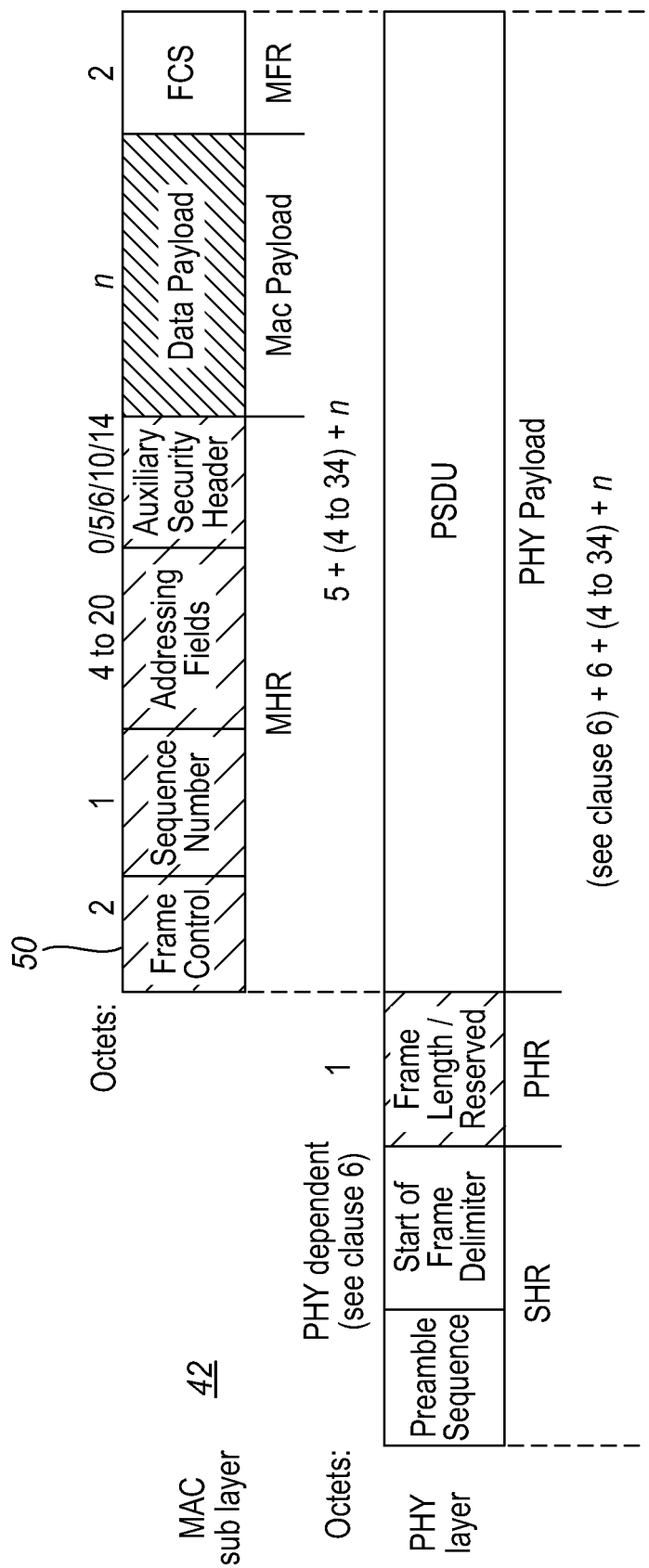
FIG. 9 shows a frame format used for a data frame in a IEEE 802.15.4 WPAN.

The structure of each of the four frame types is quite similar, and is shown in FIG. 9 for a data frame 42 by way of example. In the Figure, the two horizontal bars represent the MAC sublayer and the PHY layer respectively. Time progresses from left to right, and the time length of each successive field of the frame is shown (in octets) above the field concerned. Every frame consists of a sequence of fields in a specific order, these being depicted in the order in which they are transmitted by the PHY, from left to right, where the leftmost bit is transmitted first in time. Bits within each field are numbered from 0 (leftmost and least significant) to k−1 (rightmost and most significant), where the length of the field is k bits.

The data to be sent via the data frame 42 originates from the upper layers. The data payload is passed to the MAC sublayer and is referred to as the MAC service data unit (MSDU). The MAC payload is prefixed with an MAC Header MHR and appended with a MAC Footer MFR. The MHR contains the Frame Control field 50 (see below), data sequence number (DSN), addressing fields, and optional auxiliary security header. The MFR is composed of a 16-bit frame check sequence FCS. The MHR, MAC payload, and MFR together form the MAC data frame, (i.e., MPDU). The MPDU is passed to the PHY as the PHY service data unit PSDU, which becomes the PHY payload. The PHY payload is prefixed with a synchronisation header SHR, containing a Preamble Sequence and a start-of-frame delimiter SFD, and a PHY header PHR containing the length of the PHY payload in octets. The preamble sequence and the data SFD enable the receiver to achieve symbol synchronization. The SHR, PHR, and PHY payload together form the PHY packet (the PHY protocol data unit PPDU).

The beacon frame 41, acknowledgement frame 43 and MAC command frame 44 have a similar structure, except that the MAC payload has a different function in each case, the acknowledgement frame having no MAC payload. Also, the beacon frame 41, the acknowledgement frame 43 and MAC command frame 44 originate in the MAC sublayer without involvement of the upper layers.

The frame control field 50 used in each type of frame is shown in more detail in FIG. 10A. It consists of 16 bits assigned to subfields for different purposes as illustrated. In particular, the first three bits of the field denote the Frame Type 51: beacon frame 41, data frame 42, acknowledgement frame 43, or MAC command frame 44. The way the frame type is signified is shown in FIG. 10B. Following the frame type bits 51 is a single-bit Security Enabled subfield 52 denoting whether or not security is enabled by the MAC sublayer. This is followed by a Frame Pending subfield 53 to indicate whether the sender has more data for the recipient. Next is an Ack. Request subfield 54 to indicate whether an acknowledgement is requested from the recipient. After this follow some further sub-fields 55, to 59 which are used for addressing purposes or reserved in the current IEEE 802.15.4 specification.

As mentioned, FIG. 10B is a table of the possible bit values for the Frame Type subfield 51, showing that values 100 to 111 are unused in the IEEE 802.15.4 specification.

The MAC command frame 44 is quite similar in structure as shown in FIG. 11A. In this case the payload includes a command frame identifier 440 to identify the type of command represented by the MAC command frame. Various types of command are defined in IEEE 802.15.4 as shown in the table of FIG. 11B, showing possible values of identifier 440 with some values reserved for future use.

Having outlined the background of the present invention, the principles underlying the invention will now be explained.

The present invention addresses, for example, the situation in which patients are being monitored via a MBAN of sensors disposed on or around, or implanted in, each patient's body. Incidentally, in the subsequent description, terms such as "MBAN" or "the system" are used to refer to the totality of wireless devices in a given location, even when there are distinct networks within the overall system.

In brief, the present invention proposes a system in which both beacon-enabled and beacon-less communications are conducted together, via respective coordinators. These coordinators would normally be distinct pieces of hardware in the system but could be located together so as to share at least part of their hardware or software resources. Below, the beacon-enabled communication is called "beacon-mode" and the beacon-less communication is called "non beacon-mode".

It is assumed that at least some of the sensors are involved in sensing one or more parameters, such as heart rate, which might indicate a life-threatening situation (emergency state) for the patients. Embodiments of the present invention provide methods for switching between beacon-mode and non beacon-mode communication in response to declaration of the existence (starting) of an emergency state, and of lifting (ending) of the emergency state.

The technique to be described focuses on a dual mode, beacon and non-beacon based, channel access operation for example for a medical wireless BAN to enable the network devices (BAN devices such as medical sensors) to enjoy the benefits of both types of modes without suffering the disadvantages of the individual channel access mode. The devices in medical emergency are transferred to a primary network which employs a beacon-based channel access and non-emergency devices are subject to handover to a secondary network controlled by a secondary coordinator employing a non-beacon mode channel access. In principle, if desired, the two modes can be operated within the same physical coordinator provided the two modes operate on two orthogonal channels, such that one mode does not interfere with the other.

An initial configuration phase is based on the assumption that initially all the devices regardless of their status (emergency or non-emergency) run under one coordinator in non-beacon mode. In this embodiment, after the initial configuration, if a group of sensors are attached to a patient's body and only one out of this group of sensors goes under emergency, the entire group of sensors associated with that patient (for example, which have the same patient ID) will be handed over to the exclusive beacon mode coordinator. When none of the sensors attached to one patient is in emergency alert state, all the sensors will be handed back to the original, non-beacon mode, coordinator. Unlike conventional handover mechanisms, the trigger of this type of handover is the change of emergency state. (Conventional handover mechanisms are usually based on received signal strength, received signal quality and/or distance from a coordinator-type device such as a base station).

In addition, the embodiment of the present invention deals with the issue of mobility. Consider a scenario under which the sensors in emergency are mobile (e.g. a patient is moving) and the coordinators are relatively stationary, fixed to the wall, ceiling or a pole. In such a scenario the network devices, as they move geographically, will need to be handed over from one coordinator to another. As explained below, the trigger for the handover is based on a combination of the location of devices and an optional measure of received signal quality in either the uplink or the downlink. The location of the device and optional received signal quality parameter provides a robust handover without requiring beacon-mode coordinators. A best neighbour coordinator can be associated with each BAN device location, for example through either network planning or through network configuration phase during which "walk" tests would be carried out.

Alternatively, a minimum planning approach can be taken, where coverage areas of adjacent coordinators have a significantly larger overlap than conventional macro cellular designs and where the adjacent coordinators utilise orthogonal RF channels. With significantly large overlapping coverage areas, the location based handoff can be easily configured, manually or automatically, without requiring elaborate network planning. For example an automatic handoff can be made by means of distance-wise nearest coordinator. The device location may be the averaged location of a group of BAN devices attached to the same patient. Alternatively the location may be of the most distant device from the current active coordinator. In case of a set/group of devices attached to a patient, the handover trigger would apply to the whole set/group of devices.

An embodiment of the present invention will now be described with reference to FIGS. 12 to 22.

First, it is assumed that two star or peer-to-peer networks (topologies) have been established, where one of the networks is controlled by a primary coordinator for emergencies and another network has a secondary coordinator for non-emergency applications. It is assumed that after initial configuration we have two networks running side-by-side. The primary coordinator is a beacon-mode coordinator for use by network devices in emergency. The secondary coordinator is a non beacon-mode coordinator capable of being used by any of the network devices but providing a less reliable (less guaranteed and/or slower) communications link than the primary coordinator.

For present purposes, it is assumed that only medical devices in the system are capable of being "in emergency"; there may be other network devices 13 which are not used for medical purposes. In an initial state shown in FIG. 12, all the network devices, both devices 11E in emergency and other devices 13 not in emergency (medical or not) are communicating with the non beacon-mode coordinator 10NB. The solid double-headed arrows indicate low priority links 15 which are generally bidirectional, e.g. a sensor node will receive commands from its coordinator as well as transmitting sensor data which it has gathered. Another beacon-mode coordinator 10B is present but is not yet being used for communications by any of the network devices. Note that the network devices including those devices 11E in emergency are using peer-to-peer links with the non beacon-mode coordinator 10NB. This topology, in addition to the lack of any GTSs allocated by the non beacon-mode coordinator, will tend to slow down data transfers from and to any devices 11E in emergency. Thus, the links between the network devices (and between network devices and non beacon-mode coordinator 10NB) are shown as "low priority" links 15.

Figure 13:
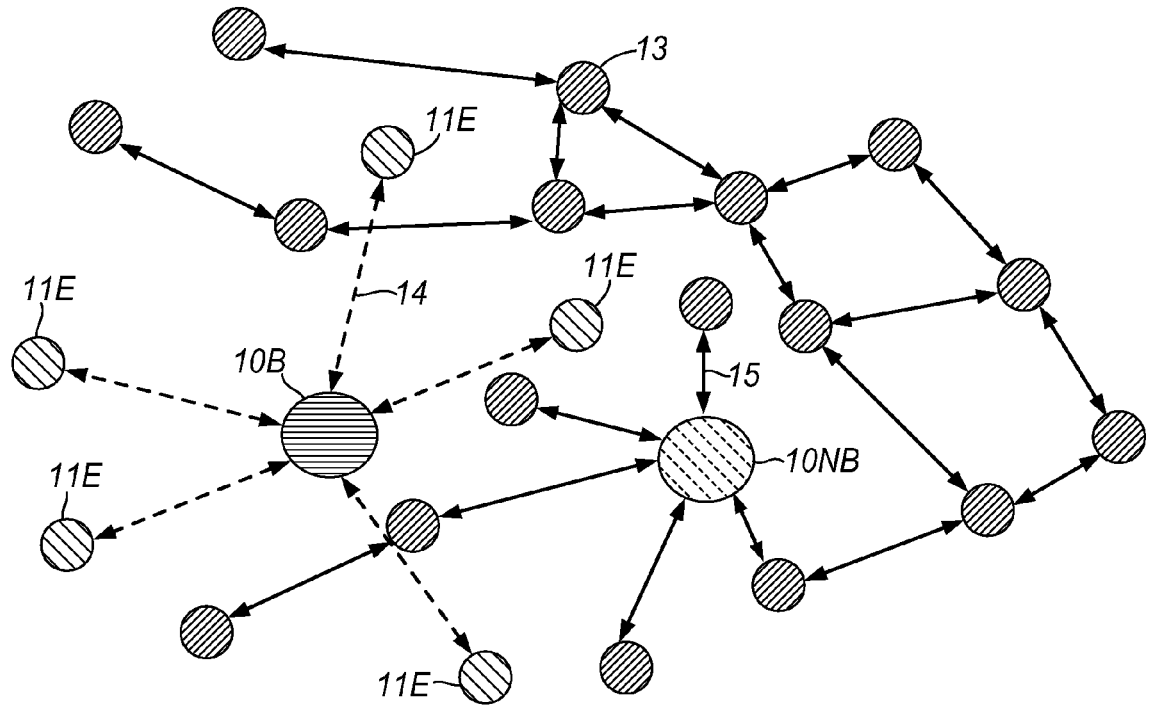
FIG. 13 illustrates a WPAN with both beacon and non-beacon coordinators and embodying the present invention, in a state after a handover.

To increase the reliability for communications of network devices in emergency, the primary coordinator is brought into active use. That is, upon recognising that one or more of the network devices are in emergency, the beacon-mode coordinator 10B is caused to commence communications with the emergency devices 11E as shown in FIG. 13, forming a new primary network for emergency communications and using (in this example) a star topology and a beacon-mode channel access such as TDMA-ALOHA. The primary network provides high-priority links 14 to each of the devices 11E in emergency, as shown by dashed lines in the Figure. Meanwhile, the already-operating non beacon-mode coordinator 10NB is used to provide a secondary network using a non-beacon based technique, providing low priority links 15 as shown by the solid arrows in the Figure. Note that the emergency topology may be star or a peer-to-peer technology. In the case of peer-to-peer traffic each node intermediate between the beacon-mode coordinator and emergency device 11E would also be linked by the high-priority links 14.

Although the coordinator 10NB is shown as being originally in the non beacon-mode it would be possible for it to switch to this mode when forming the secondary network. In this case the advantage of the primary network would be the less crowded channel and (where adopted) use of a star topology instead of peer-to-peer.

Before describing some of the protocols involved in such a dual-mode system, the are certain assumptions and considerations on radio capability in order to have the dual channel access operation realised in a manner explained below.

1. It is assumed that all the devices can receive the beacon from the involved coordinators and distinguish between the coordinators.
2. Another assumption is that the two coordinators are able to provide distinct channel access modes meaning that one of them can operate in a Guaranteed Slot mode (e.g. TDMA-ALOHA) WHILE THE OTHER one will operate in low power non-guaranteed mode.
3. As such it is assumed that under such operation the interference from one set of links (network) to another is not a concern.
4. It is also assumed that the access to the radio channel and the frequency band for the involved coordinators either a. is switched in time domain 2. or in frequency domain c. or in both frequency and time domain.

Protocol 1: Setup Configuration and Handover for Dual Channel Access Mechanisms

Figure 12:
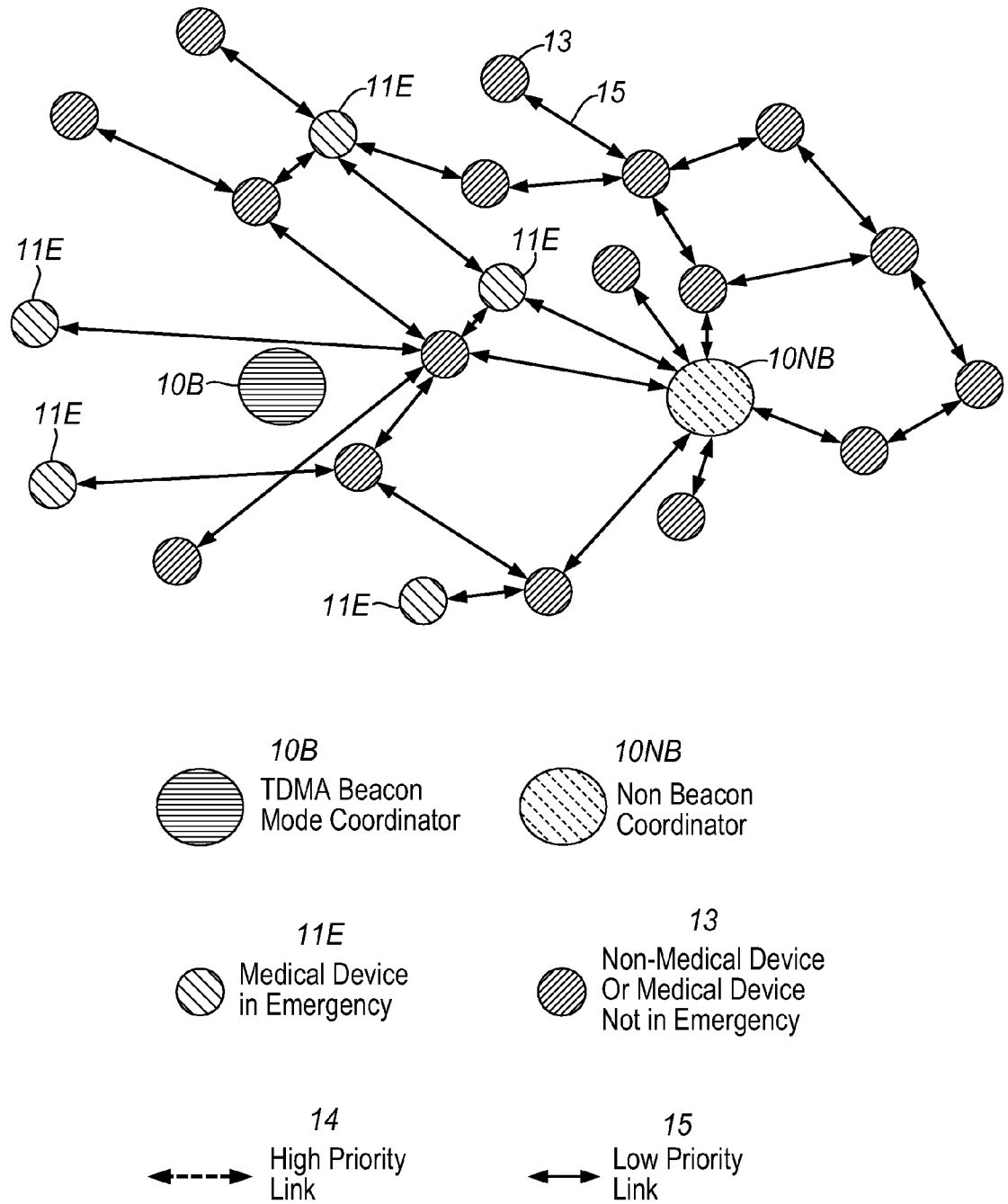
FIG. 12 illustrates a WPAN with both beacon and non-beacon coordinators and embodying the present invention, in a state before a handover.
Figure 14:
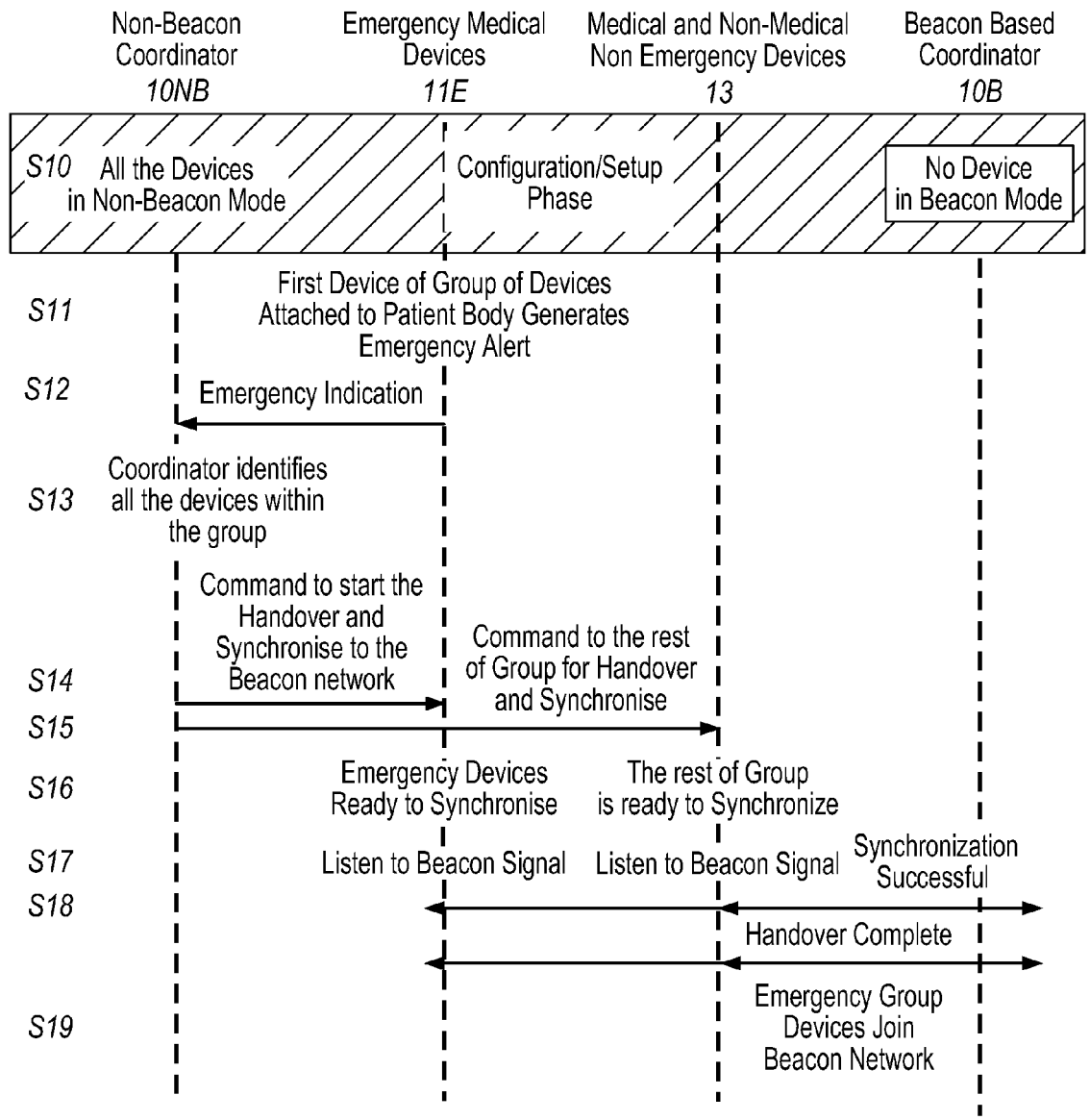
FIG. 14 shows a process flow for setup configuration and handover in an embodiment of the present invention.

FIG. 14 describes protocols for setup configuration and handover for dual channel access mechanisms under severe emergencies described in FIGS. 12 and 13 above. In FIG. 14 (and in the similar Figures following), the vertical axis represents time. Along the horizontal axis various device types are shown in respective columns, allowing their respective functions to be separated. The first column represents the non beacon-mode coordinator 10NB; the second column represents one or more network devices 11E which go into an emergency state; the third column represents other network devices 13 (both medical and non-medical), of which some may also go into the emergency state and thus be transferred to the same group as the medical network devices 11E in emergency; and the final column is for the beacon-mode coordinator 10B. The process flow is as follows.

S10: Initially, and during the set-up configuration, all the devices are assigned to the non-beacon based coordinator. Thus, as shown there is no device operating in beacon-mode.

S11: Suppose that one or more network devices declares an emergency, e.g. owing to the value of a sensed parameter reaching a critical level. Each such device is said to be "in emergency". Incidentally, it is not necessary for network devices themselves to make the initial determination of the emergency state, as this may be notified to them by some higher-level device.

S12: It is assumed that the devices 11E in emergency provide an emergency indication to the non beacon-mode coordinator 10NB. This could alternatively be provided in another way, for example by a higher-level control unit attached to the system.

S13: The non beacon-mode coordinator 10NB identifies all the devices within a related group. For example, all devices attached to the same patient in a hospital may be grouped on the basis of a patient ID number, or in some other way. Thus, it may be sufficient for only one of the devices in the group to provide the indication in step S12.

S14 & S15: The emergency devices 11E as a group are commanded to hand over and synchronise to the beacon network to be formed by beacon-mode coordinator 10B. Thus, not only a command in step S14 to the device(s) 11E in emergency, but also a command shown at step S15 to other devices, is sent by the non beacon-mode coordinator 10-NB to cause the group of devices to start handover.

S16 & S17: the devices 11E in emergency, as well as any other devices in the same group, become ready to synchronise to the beacon-mode coordinator 10B. They do this by listening for the next beacon signal from the beacon-mode coordinator, which is broadcast throughout the network. Thus, devices in the third column which generate an emergency themselves, or which belong to the same group as an emergency device, are also able to join the beacon-enabled network.

S18 & S19: the handover completes, after which the group of devices has joined the beacon network, and thus are served by the beacon-mode coordinator 10B over high-priority links. Although not shown in FIG. 14, any remaining devices outside the group (such as non-medical devices) stays in the non beacon-mode network served by non beacon-mode coordinator 10NB.

Thus, in the above handover, in the present embodiment, all the sensors attached to one patient are handed over as a group. In other words it is assumed that even if a single sensor device goes under emergency, all the other sensor devices (or a pre-selected sub-set) will be handed over to the exclusive beacon based network.

Protocol 2: Handover for Network Devices No Longer in "Emergency" State

Figure 15:
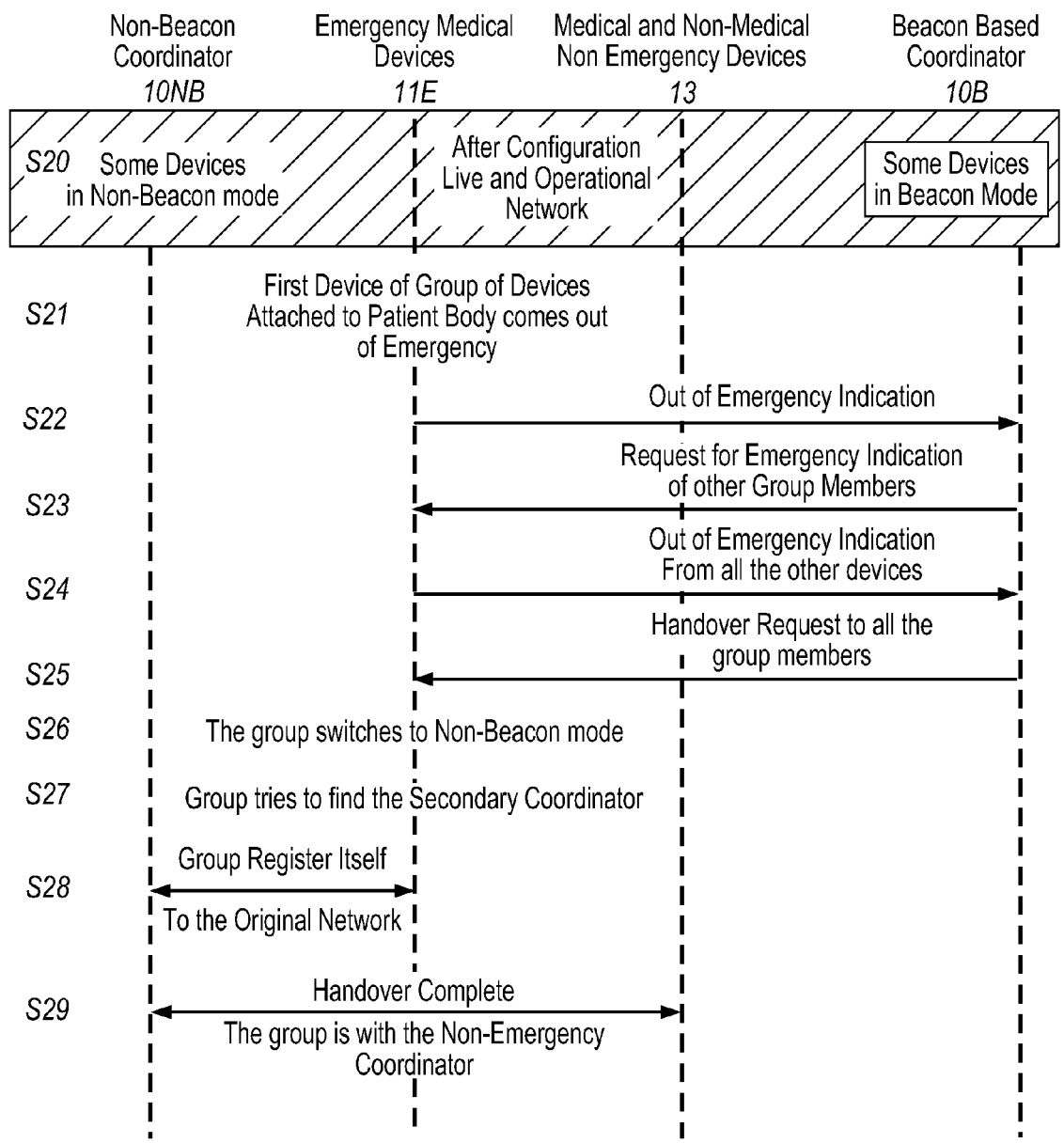
FIG. 15 shows a process flow for a handover back to an original coordinator in an embodiment of the present invention.

When the beacon-mode network is operational it is possible that one or some of devices may come out of emergency. Under such a case, the sensor devices may be handed over back to the original coordinator. The original coordinator will make sure that all the same group of devices (or a sub-set) attached to the same patient are out of emergency as shown in FIG. 15 before handing them back to the original non beacon-mode, non-emergency network:

S20: In the initial state it is assumed that both beacon-mode and non beacon-mode networks are running together with some devices in each.

S21: one of a group of network devices in emergency 11E comes out of emergency; in other words the emergency status becomes lifted at least as far as that device is concerned, for example owing to its sensed parameter no longer being at a critical value.

S22: that device 11E sends an out-of-emergency indication to the beacon-mode coordinator 10B.

S23: the beacon-mode coordinator in return sends a request to the other devices in the same group to report their status. (This of course assumes that each device is self-aware enough to do so; in an alternative arrangement where network devices cannot themselves determine the emergency state, this step and the next would be omitted).

S24: the other devices in the group confirm their status to the coordinator 10B. That is, each confirms that it is no longer in emergency; for example, that the current value of a life parameter of a patient being sensed by the network device in question is within an acceptable range.

S25: Once the coordinator 10B is satisfied that there is no longer any need to maintain the devices 11E of the emergency group within the beacon-mode network, coordinator 10B sends a handover request to all of the devices in the group.

S26: the devices in the group switch to non beacon-mode.

S27 & S28: the devices 11E try to find a non beacon-mode coordinator within range (in the case where more than one such coordinator is available, the nearest coordinator or the one providing the strongest signal may be chosen). Upon finding a non beacon-mode coordinator they register themselves with the non beacon-mode network.

S29: Handover is now complete, so that the group of devices now conduct communications with the non beacon-mode coordinator 10NB over low-priority links. Although not shown, high-priority links via the beacon-mode coordinator 10B may be maintained for another group(s) of devices still in emergency, for example a group of devices monitoring another patient.

Protocol 3: Handover Procedure for Dual Access Mode Operations with Minimum Device Functionality Based on Positioning Mechanism: Sensor Device has Mobility In some scenarios, network devices may be mobile, or in other words capable of moving relative to their coordinator. For example, in a hospital, each group of sensors attached to a patient would move relative to fixed coordinators attached to beds or walls, etc., as the patient moves or is moved.

In this case, there is a possibility that one emergency device, or a group of emergency devices already accepted by the new coordinator 10B, forming an exclusive group of TDMA devices with a guaranteed slot, may start to move away from its coordinator (for example one of two emergency patients moving away from the exclusive coordinator). Under such mobility it is possible that the beacon-mode coordinator 10B will no longer be able to maintain the quality of service for the emergency devices. The major concern here is the fact that if the moving sensor attempts to follow continuous update or traditional handover procedures, this could cause rapid battery depletion of the emergency devices.

Figure 16:
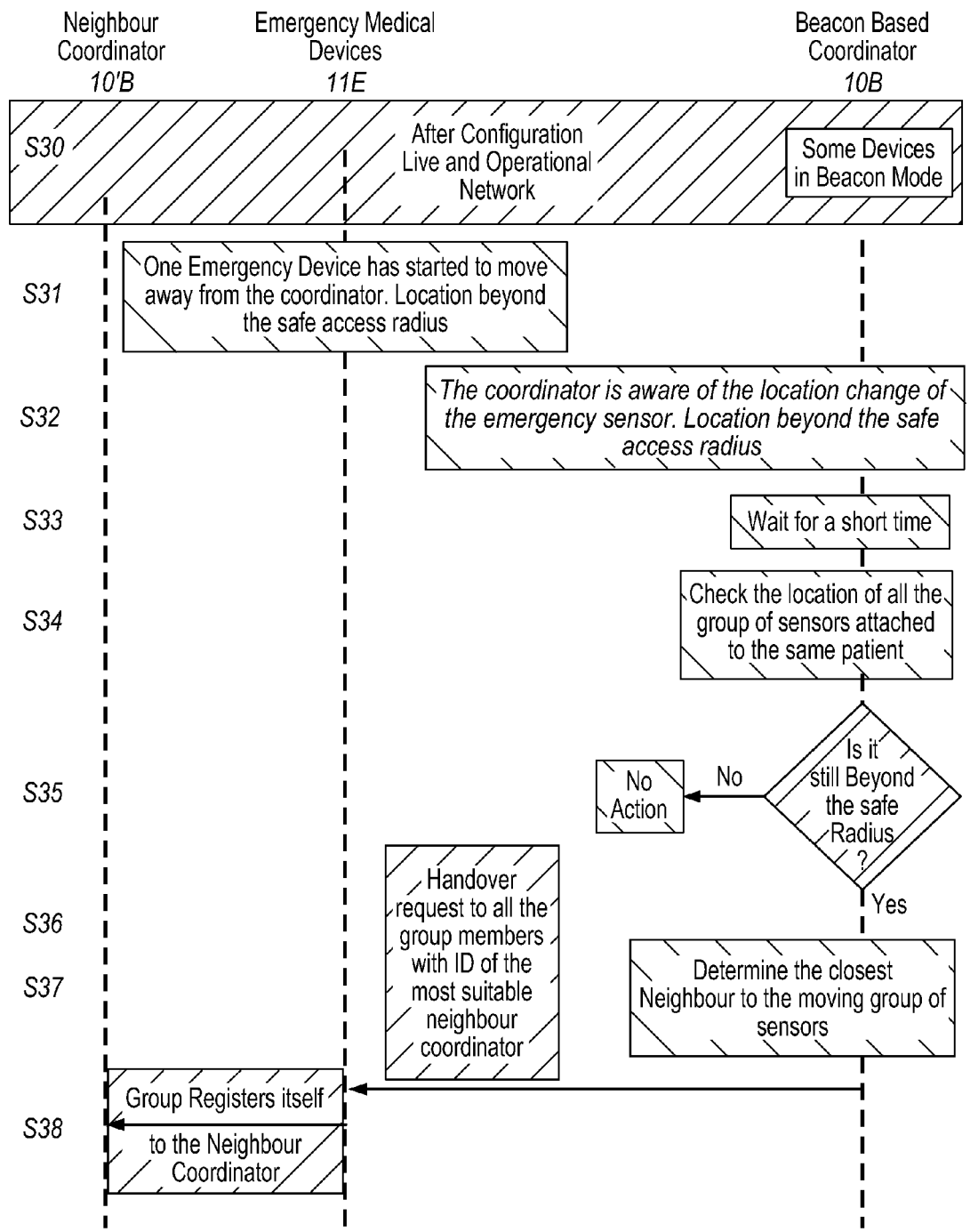
FIG. 16 shows a process flow for a handover based on location in an embodiment of the present invention.
Figure 17:
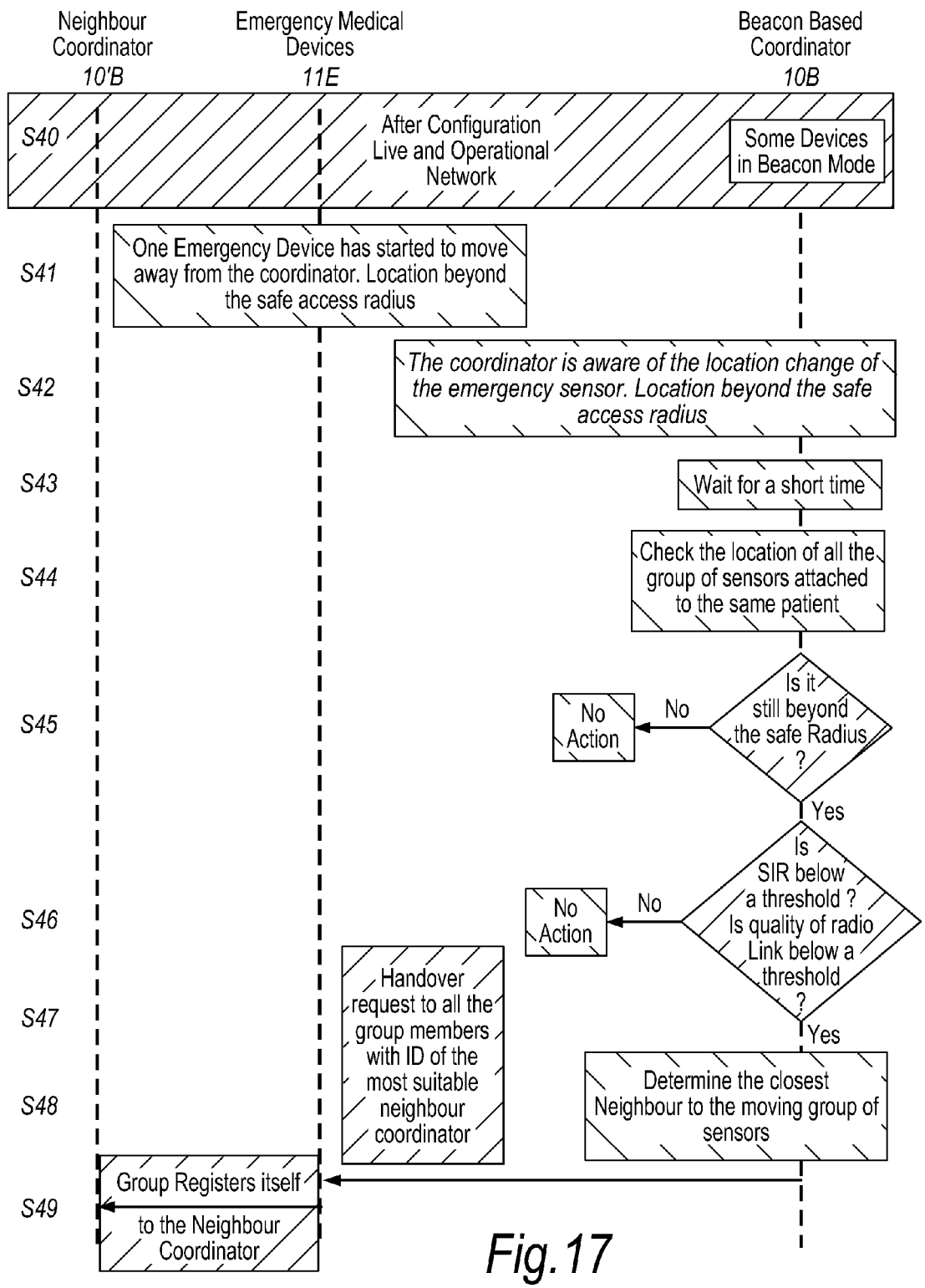
FIG. 17 shows a process flow for a handover based on location and signal/connection quality, in an embodiment of the present invention.

To avoid such a situation, the secondary handover scheme in FIG. 16 can be used to avoid sensor device functionalities as far as possible. That is, the need for action and signalling by the sensor devices in emergency is minimised to avoid unnecessary power consumption. It is assumed that there is a positioning entity (for example, existing UWB technology) which is capable of telling each coordinator about the location of each sensor and other available coordinators. It is also assumed that the beacon-mode coordinator 10B (exclusive emergency coordinator) has an acceptable transmission range or safe access radius beyond which the handover will be triggered. Preferably, this radius is the safe distance for reliable communications. Immediately beyond the safe radius, the devices will still be able to hear the coordinator, but the quality of connection will drop to an unacceptable level for exclusive medical emergency operation as the network device moves further away beyond that safe radius. Finally, it is assumed that a plurality of network devices are attached to the same patient, and that these are treated as a group in the sense that if one device declares an emergency, all the devices in the group (i.e. some or all of the sensors attached to the same patient) are in emergency.

The procedure is as follows:

S30: The procedure starts from an initial state in which it is assumed that some network devices 11E in emergency are communicating via the primary network with the beacon-mode coordinator 10B.

S31: Suppose that one network device 11E or a group of devices moves away from the coordinator 10B such that it is now outside the safe radius for communication. Usually, in the scenario assumed above, this will occur as a result of the patient moving (or being moved).

S32: The beacon-mode coordinator 10B detects the change of position in some way (either by internal means or by being informed of the position by an external source).

S33: The beacon-mode coordinator 10B waits a short time to avoid acting on short-term movements. That is, it is avoided to trigger a handover based on random or short-term movements.

S34: The beacon-mode coordinator 10B checks the positions of other sensors (network devices) within the same group. As before, the "group" may be, for example, a part or all of the sensors attached to the same patient.

S35: The coordinator 10B judges whether the group is (still) outside the safe radius. An average position of the devices within the group could be used for this purpose. If not (for example, if the patient to whom the group of sensors is attached has moved back closer to the coordinator 10B), no action is taken.

S36: If the group is judged to be out of range, the beacon-mode coordinator 10B determines the best candidate coordinator to which to hand over the group of sensors. This will generally be simply the closest coordinator to the group's current position but the determination could take account of existing loads on other coordinators, the movement trend of the group, and other factors. Note that a coordinator need not be a distinct type of device from the network devices (sensors) and in some implementations, some or all of the network devices may be capable of acting as coordinators providing possibly several candidates to choose from.

S37: The coordinator 10B issues a handover request to the group of sensors in emergency. This includes an identification of the nearest-neighbour coordinator (preferably beacon-mode) with which the group is to establish communications links.

S38: The group of sensors registers itself with the new coordinator 10'B to complete the handover. Note that this is more than just a handover of individual devices, but rather the handover of a group of devices in the emergency state; in effect the patient himself, or herself, has been handed over. In this way, it is ensured that patients can be monitored, followed and traced as they move around a hospital for example.

Protocol 4: Handover Procedure for Dual Access Mode Operations with Minimum Device Functionality Based on Positioning Mechanism and Signal Quality Under a fourth protocol (FIG. 17), a similar situation is assumed as considered for the third protocol (FIG. 16). The difference is that in addition, the signal quality or the quality of radio link is monitored to assist the decision about handover on top of location information.

S40-S45: As steps S30-S35 above, respectively.

S46: The primary coordinator 10B decides whether or not the SIR and/or quality of the radio link with the group of sensors, is below an acceptable threshold. Here, the SIR could simply be that of uplink signals received from the sensors themselves, or could be a value of signal strength on the downlink as reported back by the sensors. If the signal is acceptable, then regardless of the movement of the sensor group there is not (yet) any necessity for a handover, so no action is taken.

S47: If, in addition to the sensors moving out of the safe radius, their signal strength is also unacceptably low, this means that a handover is required. The coordinator 10B determines the best candidate for this purpose.

S48: A handover request is issued to the group of sensors, specifying which new coordinator is to be used.

S49: The group register themselves with the new coordinator 10'B to complete the handover procedure.

In order to declare the state of emergency, it is vital to communicate the emergency status to other radio nodes. Some description will now be given of how the above protocols may be accommodated within a communications standard, like IEEE 802.15.6 currently under development, drawn from IEEE 802.15.4.

FIGS. 18 and 19 illustrates a first possible modification to the IEEE 802.15.4 frame format in one embodiment of the present invention, to accommodate the emergency situation through the addition of a new bit labelled "emergency" and make it suitable for IEEE 802.15.6. In this first possible modification, allowance is made for a novel emergency frame type but without making any other changes to the frame types in IEEE 802.15.4.

As already outlined, IEEE 802.15.4 provides various frame types including beacon frame 41, data frame 42, acknowledgement frame 43 and MAC Command frame 44. In IEEE 802.15.6, one way to implement the above-described procedures is to introduce a further frame type, the emergency frame, in order to declare the emergency state (or non-emergency state) to the destination device.

FIG. 18 shows the structure of a Frame Control Field 500, corresponding to the Frame Control Field 50 of FIG. 10A already proposed for IEEE 802.15.4. As will be seen by comparing FIG. 18 with FIG. 10A, bits 0-2 denote the frame type 501 as in IEEE 802.15.4, but the possible frame type values are changed as shown in FIG. 19. Of the previously reserved values 100-111 (see FIG. 10B), bit value "111" is now used to denote the novel emergency frame type. Values 100 to 110 remain as reserved values for future use.

In the remaining subfields of the frame control field 500, basically the same components are present as in the frame control field 50 of FIG. 10A, except that bit no. 7 is newly used as a flag for the emergency state (for example: "1"=emergency and "0"=no emergency). Bit 8 is now used to represent an Ack policy (corresponding to the Ack request subfield of FIG. 10A). The subfields for security enabled bit 502, Frame Pending bit 503, PAN ID compression 506, destination addressing mode 507, frame version 508 and source addressing mode 509 have the same functions as their counterparts in IEEE 802.15.4 frame control field 50.

FIGS. 20 and 21 illustrate a second possible modification to the IEEE 802.15.4 frame format in another embodiment of the present invention, to accommodate not only the emergency frame type but other novel features including a more flexible ACK provision including a so-called immediate ACK, an indication of the state of a battery of a network device, and an indication of "urgency".

The format of the frame control field 500' of FIG. 20 differs from that 500 of FIG. 18 mainly in that the single bit 505 for Ack policy is replaced by two bits for defining different ACK types, and in that indications of battery state (i.e. remaining charge or voltage level) and "urgency" are represented by new subfields 511 and 512 requiring additional bits (labelled "Extd bits" 0-3 in the Figure). As can be seen, two bits each are allocated to each of "Urgnt" and "Batt Level" allowing up to four levels to be defined for each. The meaning and use of these new subfields is outside the scope of the present invention, but it is noted here that they may be used in conjunction with the beacon-mode/non beacon-mode switching in the present invention to provide more flexible signalling between the devices of a BAN.

The IEEE 802.15.4 modified frame type values in this case are as shown in FIG. 21, which should be compared with FIGS. 10B and 19. Compared with the embodiment of FIG. 19, the difference is that the previously-reserved values 100 and 101 are now used to denote two types of ACK, i.e. immediate ACK and delayed ACK, the immediate ACK being used, for example, for devices in emergency to acknowledge each individual frame of received data for a more reliable communication. The immediate ACK is the subject of a co-pending application by the same applicant.

As a further technique for integrating the novel features of the present invention into frame structures already proposed, the command frame identifier of a MAC command frame (refer back to FIGS. 11A and 11B) may be used. FIG. 22 shows the modification required to a MAC command frame 44' including the addition of new command types "Emergency notification" and "Handover" to the table of possible values, taking up values 0x0a and 0x0b which were previously unused. In addition to defining the new command types, the payload following the command frame identifier is used to give information (context) for the command. In the case of MAC command frame 44' shown in FIG. 22, an example of a payload would be the ID of the most suitable candidate coordinator(s) to which the receiving device should hand over. An alternative payload, in the case of a command type "Emergency notification" would be an associated time value such as a time duration of the emergency state (in ms) or a time until the emergency state is valid (ms since a known timing reference point or epoch).

To summarise, an embodiment of the present invention may provide the following features:

The concept of handover of emergency devices to an exclusive TDMA based network within a system of networks. The handover is triggered when one device out of group of sensor devices attached to a patient body goes under emergency. The whole group of MBAN sensors attached to one patient are handed over between the networks.

A handover back mechanism where the handover is triggered if the entire group of sensors attached to the patient come out of emergency.

When an emergency patient is moving away from the coordinator, the QoS and quality of radio link may drop if the sensors move beyond an access radius from the coordinator. Under such a case, the coordinator is aware of the sensor location and a location based handover is triggered. As an option in addition to the location, the QoS, SIR or quality of radio link can also be considered to make handover decisions.

A new control frame structure including the emergency format for IEEE 802.15.6.

As a result the following advantages can be achieved:

Embodiments of the present invention enable a dual mode, beacon and non-beacon based, channel access operation for a medical wireless BAN which in turn enables the BAN devices to enjoy the benefits of both types of modes (e.g.: guaranteed throughput and low power consumption) without suffering the disadvantages of the individual channel access mode (e.g.: high channel access latency and high power consumption).

The above dual mode operation can increase the reliability of communications in a medical wireless BAN, particularly for medical emergency situations.

INDUSTRIAL APPLICABILITY

Embodiments of the present invention may have a vital role to play in facilitating emergency management by use of MBANs. The following scenarios may be noted:

(i) Hundreds of millions of patients worldwide with cardiac and heart problems can be monitored in hospital or at home by employing wireless sensors forming an MBAN on their bodies. The MBAN can provide extra mobility for such patients. However, for this group of patients under situations such as abnormal heart functioning or more severe cases such as heart attack, it is vital to secure a reliable communication channel to make sure that no emergency or alarm signal will be missed. The present invention provides a secure emergency trigger mechanism to make all the entities involved aware about an emergency by sending an "Emergency Acknowledge".

(ii) Hundreds of millions of people worldwide suffer from diabetes. Implantable or non-invasive methods for glucose measurement have been considered recently. An MBAN can be used to monitor a patient's glucose level information on a 24-hour basis. There are situations where the patient's glucose level is off the chart and emergency geolocation and other necessary urgent medical procedures for the patients are required.

(iii) MBANs may be used to gather sensed data while monitoring a patient in intensive care where the loss of data could be life threatening.

(iv) Improves the labour costs and efficiency of emergency response in a medical system.

(v) Improves the emergency awareness in a medical MBAN system.

(vi) Reduces the labour costs by automating the emergency response process.

(vii) Although primarily envisaged for low data-rate applications, MBANs could have application to transfer of streaming video/audio data where loss of individual packet is crucial and affects the quality. Erroneous data may have a negative impact on the diagnosis of illness in emergency cases.

(viii) For medical diagnosis, MMR or X-ray images need to be very clear in order for the doctor to diagnose properly the patient. Again, therefore, reliable data transfer is essential.

In summary, the present invention can provide a technique for performing communications of network devices (11E, 13) in a wireless sensor system served by a first coordinator (10NB) for non beacon-mode communication and a second coordinator (10B) for beacon-mode communication, the network devices associated with at least one entity to be monitored and the method comprising: initially, placing all the network devices (11E, 13) in a first network served by the first coordinator (10NB); monitoring one or more parameter of the or each entity by sensors of the associated network devices (11E); transmitting sensor data from the network devices in the first network to the first coordinator (10NB); detecting starting or ending of an emergency state with respect to a said entity by using the monitored parameters; in response to detection of starting of the emergency state with respect to a said entity, handing over the associated network devices (11E) to the second network; transmitting sensor data from the network devices in the second network to the second coordinator (10B); and in response to detection of ending of the emergency state with respect to a said entity, handing over the associated network devices to the first network.

The present invention may take the form of a novel network device (sensor), coordinators, or hardware modules for the same, and can be implemented by replacing or modifying software executed by processors of the network devices and/or each coordinator.

Thus, embodiments of the present invention may be implemented in hardware, or as software modules running on one or more processors, or on a combination thereof. The invention may also be embodied as one or more device or apparatus programs (e.g. computer programs and computer program products) for carrying out part or all of any of the techniques described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to the existence or non-existence of an emergency state, these are not the only two possible conditions of a monitored entity such as a patient. For example, a third condition such as "abnormal" could be introduced to signify that the patient (or more correctly, the value of a certain sensed life parameter) is giving cause for concern though not yet in an emergency condition. This could either be declared explicitly, or defined implicitly by not declaring the ending of the emergency state right away, but rather waiting until the sensed value has returned to a normal reading. In other words, it may be preferable to delay handing over to the non beacon-mode coordinator in case the patient slips back into an emergency state.

Although the above description has referred only to sensors and coordinators in a wireless sensor system such as an MBAN, it is possible for a MBAN to include other devices than these kinds. Potentially, some means of intervening in the patient's care, such as a drug dispensing mechanism, could be arranged in the network under wireless control of the coordinator. Thus, the beacon-mode need not be confined to control of sensors and their communications, but could be used for example for commands to deliver a drug to the patient to stabilise a life parameter (heart rate, for instance) in an emergency state.

An MBAN may also be provided with some form of central control and monitoring unit, as already mentioned above, in communication (not necessarily via the MBAN itself) with the coordinators. Such a central control could be involved in declaring the starting or lifting of the emergency state, for example.

The above description has concerned techniques for determining a medical emergency or non-emergency of a patient, since this is seen as an important application of the present invention. However, it is not the only possible application. Sensors could be used to monitor a living body in non-medical situations. For example, any person at risk (examples: old or frail people, or children; people in dangerous environments, etc.) could be monitored using the same techniques as described above. In this case, the emergency condition would represent some form of physical threat such as an accident. Sensors for such life parameters such as pulse, temperature, acceleration etc. would be of particular use in this situation. In the emergency state it would be desirable to switch to beacon-mode communication where possible, just as in the medical scenario.

There are many possibilities for applying the present invention beyond the BAN of a human or other living body. One possibility is a system capable of detecting industrial emergencies such as many potential scenarios in a mission critical industrial environment (for example, power stations). This can apply to multiple control points in a factory environment. For example we may consider temperature sensors in a factory's heating facility or pressure thresholds for food product lines. The dual use of beacon-mode and non beacon-mode coordinators in such a system may be applied to emergencies in these systems just as for medical emergencies. Thus, the term "entity" in the claims is to be interpreted as covering any such industrial environment in addition to a living being.

Although the above description has referred to IEEE 802.15.4 and IEEE 802.15.6 by way of example, the invention may be applied to any type of frame-based wireless sensor system or MBAN whether or not operating in accordance with IEEE 802.15.6, as well as to other types of BAN which even if not medical body area networks nevertheless have a requirement for improved reliability of communication in emergency situations.

The invention claimed is:

1. A wireless sensor system comprising a plurality of network devices placed in a first network served by a first coordinator, one or more parameters of an entity being monitored by sensors of the associated network devices, sensor data being transmitted from the network devices in the first network to the first coordinator; detecting starting or ending of an emergency state with respect said entity by using the monitored parameters, the first coordinator arranged to perform non-beacon-mode communication with a first subset of the network devices transmitting sensor data to the first coordinator, and a second coordinator arranged to perform beacon-mode communication with a second subset of the devices transmitting sensor data to the second coordinator after a handover of communication responsibility in an emergency state, the system having means for determining which of the network devices to include in the first or second subsets in dependence upon whether the emergency state exists with respect to the devices.

2. The wireless sensor system according to claim 1, wherein the network devices are each assigned to one of a plurality of groups each for monitoring a respective entity and said emergency state is an emergency affecting the entity monitored by the group, the devices of a group being included in or handed over between said first and second networks as a unit.

3. The wireless sensor system according to claim 1 wherein the existence or non-existence of said emergency state is determined based on a critical level of one or more parameters sensed by sensors of the network devices.

4. A coordinator in the wireless sensor system according to claim 1.

5. The wireless sensor system according to claim 1, wherein each entity is a living body.

6. The wireless sensor system according to claim 5, applied to monitoring one or more medical parameters of the living body.

7. A method of performing communications of network devices in a wireless sensor system formed of respective networks served by a first coordinator for non beacon-mode communication and a second coordinator for beacon-mode communication, the network devices associated with at least one entity to be monitored and the method comprising steps of:

placing all the network devices in a first network served by the first coordinator;

monitoring one or more parameter of the or each entity by sensors of the associated network devices;

transmitting sensor data from the network devices in the first network to the first coordinator;

detecting starting or ending of an emergency state with respect to a said entity by using the monitored parameters;

in response to detection of starting of the emergency state with respect to a said entity, handing over the associated network devices to the second network;

transmitting sensor data from the network devices in the second network to the second coordinator; and in response to detection of ending of the emergency state with respect to a said entity, handing over the associated network devices to the first network.

8. The wireless sensor system according to claim 1, for monitoring one or more entities using the network devices, wherein said emergency state is an emergency affecting the entity monitored by the network devices.

9. The wireless sensor system according to claim 8, wherein the network devices are each assigned to one of a plurality of groups each for monitoring a respective entity and said emergency state is an emergency affecting the entity monitored by the group, the devices of a group being included in or handed over between said first and second subsets as a unit.

10. The wireless sensor system according to claim 8, wherein the existence or non-existence of said emergency state is determined based on a critical level of one or more parameters sensed by sensors of the network devices.

11. The wireless sensor system according to claim 1, wherein the first and second coordinators are arranged to start from an initial state in which all network devices are included in the first subset, to hand over one or more network devices from the first to the second subset in response to starting of the emergency state, and to hand over one or more network devices from the second to the first subset in response to ending of the emergency state.

* * * * *